(12) United States Patent
Bao et al.

(10) Patent No.: US 10,084,780 B2
(45) Date of Patent: *Sep. 25, 2018

(54) NETWORK-BASED AUTHENTICATION AND SECURITY SERVICES

(71) Applicant: Verizon Patent and Licensing Inc., Arlington, VA (US)

(72) Inventors: Guanqun Bao, Sunnyvale, CA (US); Brian Libonate, Walnut Creek, CA (US); Raymond C. Counterman, Canton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 213 days.

This patent is subject to a terminal disclaimer.

(21) Appl. No.: 15/059,217

(22) Filed: Mar. 2, 2016

(65) Prior Publication Data
US 2017/0171200 A1 Jun. 15, 2017

Related U.S. Application Data

(63) Continuation-in-part of application No. 14/970,180, filed on Dec. 15, 2015.

(51) Int. Cl.
*H04L 29/00* (2006.01)
*H04L 29/06* (2006.01)
(Continued)

(52) U.S. Cl.
CPC ........ *H04L 63/0884* (2013.01); *H04L 9/3213* (2013.01); *H04L 9/3247* (2013.01);
(Continued)

(58) Field of Classification Search
CPC ... H04L 63/0876; H04L 63/083; H04L 63/20; H04L 63/0853; H04L 63/10; H04L 41/046
See application file for complete search history.

(56) References Cited

U.S. PATENT DOCUMENTS 7,945,034 B2   5/2011   Gonen et al.
2012/0210119 A1*  8/2012   Baxter .............. G06F 17/30861
                                                           713/150
(Continued)

OTHER PUBLICATIONS

Hardt, "The OAuth 2.0 Authorization Framework", Internet Engineering Task Force (IETF) Request for Comments 6749, Oct. 2012 (available at https://datatracker.ietf.org/doc/rfc6749/).
(Continued)

*Primary Examiner* — Ghazal B Shehni

(57) ABSTRACT

A user device may request access to a service provided by an application server. The application server may request that an identity server authenticate the user device. The identity server may have a network authentication system assist with the authentication of the user device. Once authenticated by the network authentication system, the application server may be informed and may grant the user device access to the requested service. Additionally, the identity server may help determine whether the user device is a security threat by comparing user information from the network authentication system with user information from the application server. Additionally, the network authentication system may provide the application server with user information to enable the application server to automatically register the user device for a particular service.

20 Claims, 23 Drawing Sheets

(51) Int. Cl.
*H04L 29/08* (2006.01)
*H04L 9/32* (2006.01)
*H04W 12/06* (2009.01)
*H04L 29/12* (2006.01)

(52) U.S. Cl.
CPC ........ *H04L 63/0435* (2013.01); *H04L 63/083* (2013.01); *H04L 63/0876* (2013.01); *H04L 63/126* (2013.01); *H04L 67/02* (2013.01); *H04L 67/10* (2013.01); *H04W 12/06* (2013.01); *H04L 61/2007* (2013.01)

(56) References Cited

U.S. PATENT DOCUMENTS

| | | | |
|---|---|---|---|
| 2012/0276868 A1* | 11/2012 | Martell | H04L 12/1453 455/406 |
| 2014/0157381 A1* | 6/2014 | Disraeli | G06F 21/31 726/7 |
| 2017/0026187 A1 | 1/2017 | Ramatchandirane | |
| 2017/0026339 A1 | 1/2017 | Degenkolb et al. | |
| 2017/0302642 A1 | 10/2017 | Hindocha et al. | |

OTHER PUBLICATIONS

Sakimura, et al., "Open ID Connect Core 1.0 incorporating errata set 1", Nov. 2014 (available at http://openid.net/specs/openid-connect-core-1_0.html).

* cited by examiner

NETWORK-BASED AUTHENTICATION AND SECURITY SERVICES

CROSS-REFERENCE TO RELATED APPLICATIONS

This application is a continuation-in-part of, and claims the benefit of, U.S. patent application Ser. No. 14/970,180, titled "NETWORK-BASED FRICTIONLESS TWO-FACTOR AUTHENTICATION SERVICE," filed Dec. 15, 2015, the contents of which are hereby incorporated by reference in their entirety.

BACKGROUND

Wireless telecommunications networks and the Internet have made a wide variety of network services readily available to users. Examples of such services include social networking services, banking services, communication services (e.g., email, instant messaging and video calls), etc., which may be accessed from mobile devices, such as smartphones, and non-mobile user devices, such as desktop computers. A pervasive concern in providing network services (also referred to herein as, simply, "services") is maintaining a level of security that effectively prevents individuals from accessing services unlawfully. Another pervasive concern in providing such services in a fast and convenient manner. For example, when a user attempts to access a particular network service by, for example, attempting to log on to a user account hosted by an application server, the organization in charge of the application server may implement certain authentication procedures.

For example, the application server may require the user to provide valid credentials (e.g., a username and password) in order to ensure that the network service is not accessed by unauthorized users. In some instances, the authentication procedures may also require the user to provide additional information, such as a mother's maiden name, a birthday, a place of birth, etc. While such measures may help ensure the security of the application server, requiring the user to provide extensive authentication information may be cumbersome on the user. As such, the information required to authenticate the user may be limited to, for example, a username, a password, and one more type of information (e.g., a place of birth, a mother's maiden name, a mobile device number (MDN), etc.). In some instances, requiring such information for authentication may be referred to as a two-factor authentication procedure, with the username and password being the first factor and the additional information (e.g., a birth place, a mother's maiden name, etc.) being the second factor.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

Figure 1A:
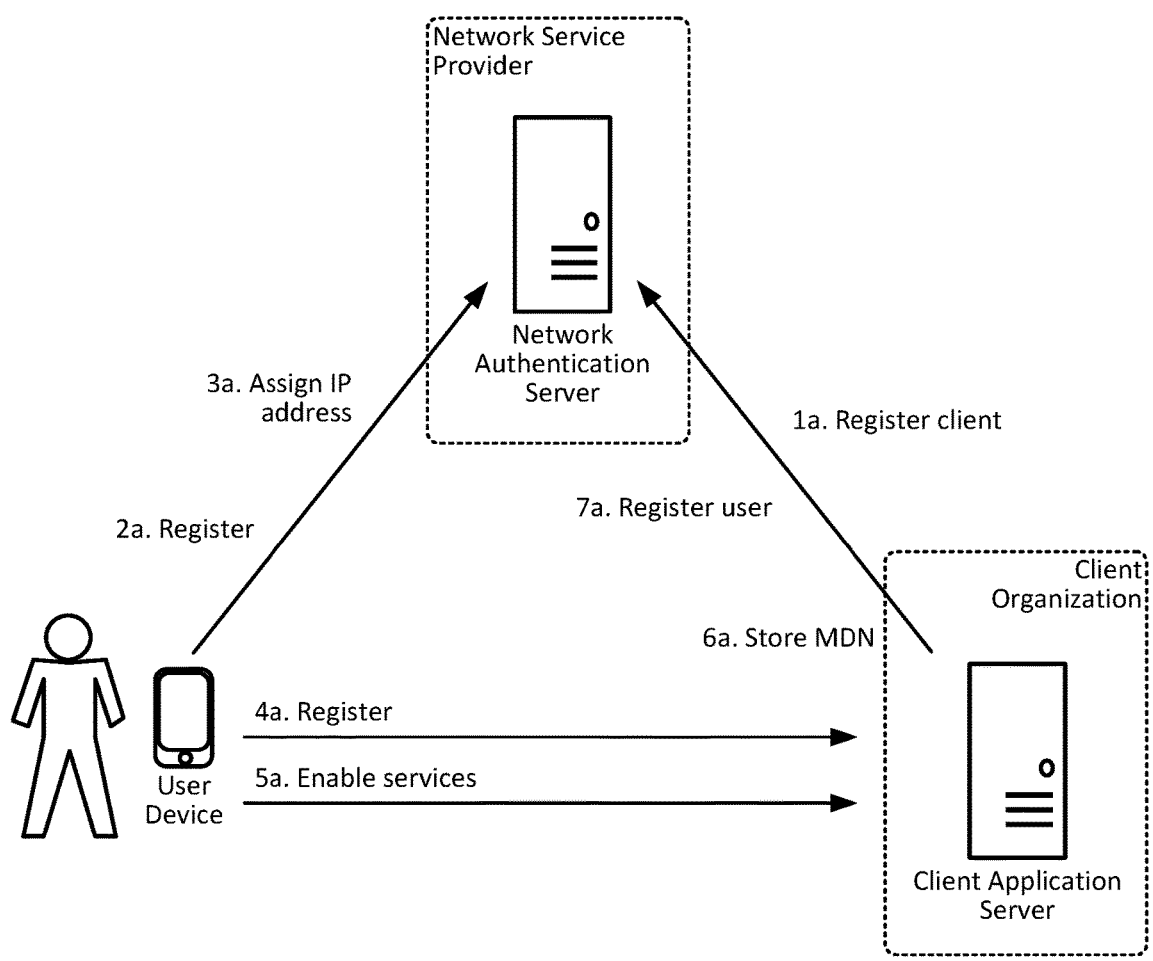
FIGS. 1A and 1B illustrate an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Techniques described herein may be used to enable a network service provider (e.g., a service provider of a wireless telecommunications network) to provide an application server with one or more services, such as authenticating user devices, assisting with the detection of security threats, and providing subscriber information to enable the automatic creation of user accounts. For example, a user device (e.g., a smartphone, a laptop computer, etc.) may attempt to access a service provided by an application server (e.g., a social networking service, an online banking service, a communication service (e.g., email, instant messaging, and video calls), etc.), and the application server may request that an identity server assist with the authentication of the user device. To do so, the identity server may communicate with a network authentication system (which may be owned and operated by a network service provider), which may authenticate the user device.

Once the user device is authenticated by the network authentication system, the network authentication system and/or the identity server may perform one or more services for the application server. For example, the network authentication system may inform the identity server that the user device has been authenticated (or is known and trusted by the network authentication system), and the identity server, in turn, may inform the application server that the user device has been authenticated. In another example, the network authentication system may help the identity server to determine whether the user device is a security threat to the application server.

For example, the network authentication system may provide subscriber information (also referred to herein as "user information"), corresponding to a particular user device, to the identity server. Examples of subscriber information may include information corresponding to the user of the user device, such as a first name, a last name, an email address, a street address, an MDN, etc. The identity server may compare the subscriber information from the network authentication system with subscriber information from the application server. Based on the comparison, the identity server may inform the application server whether the user device appears to be a security threat to application server (e.g., appears to be a different device than a known device). In another example, after the user device has been authenticated, the network authentication system may provide the identity server with user information, associated with the user device, and the identity server may, in turn, provide the user information to the application server. The user information may enable the application server to automatically register the user device for a particular service (e.g., by creating a user account, filling out an electronic application, order, or other type of electronic form, setting up a payment or financial transaction, etc.).

Figure 1B:
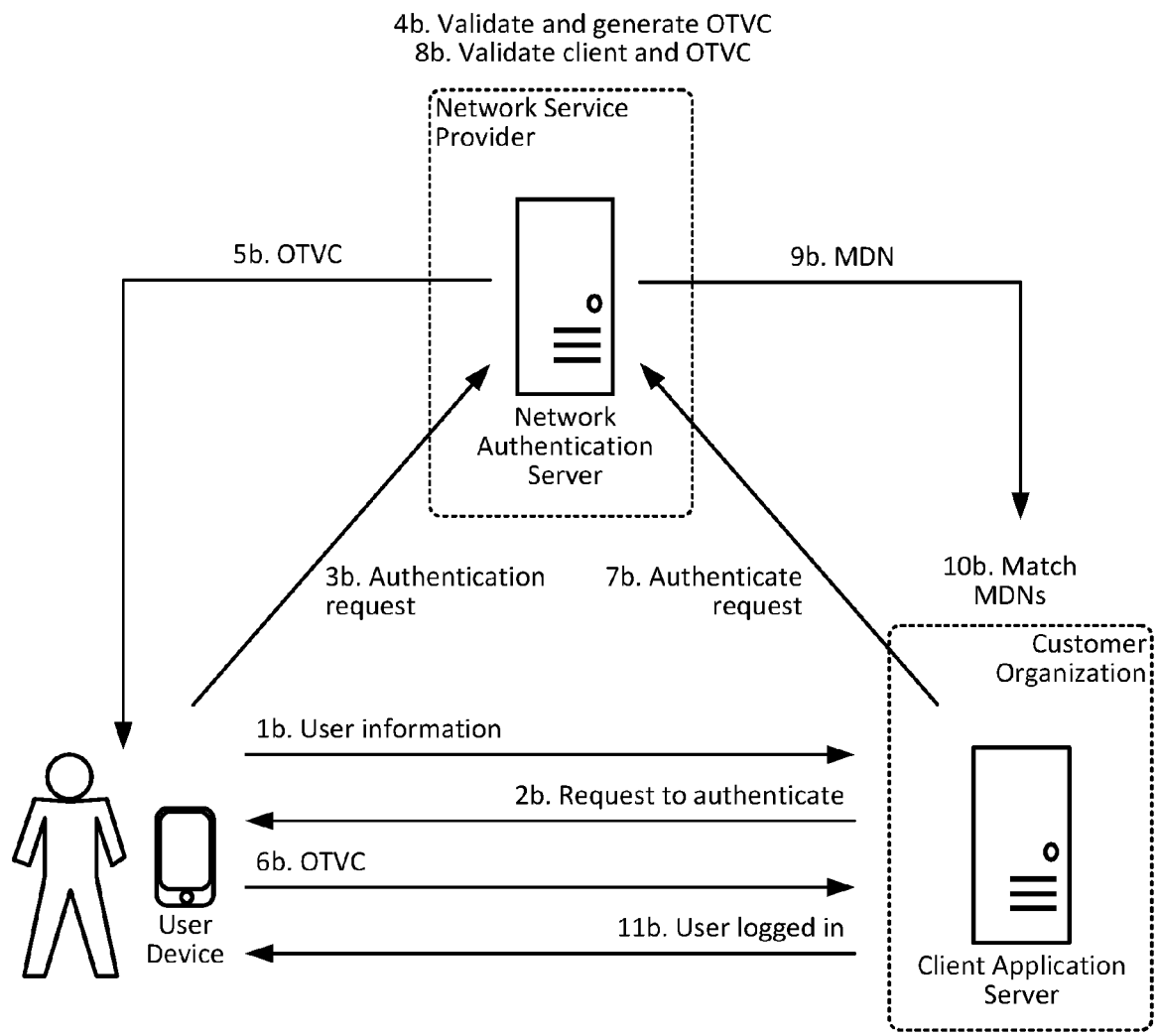

FIGS. 1A and 1B illustrate an example overview of an implementation described herein. FIG. 1A may include an example of a procedure for setting up, or registering, a user device for authentication support services regarding a two-factor authentication process, while FIG. 1B may include an example of a two-factor authentication procedure using authentication support services. Referring to FIG. 1A, an organization, such as a network service provider, may provide wired and/or wireless network services to customers (or clients), which may include individual users and organizations (e.g., businesses, academic institutions, government agencies, etc.). Examples of such services may include access to a wireless telecommunications network, access to a wired network (such as the Internet), data storage services, data security services, access to multimedia content, etc. In some implementations, clients of the network service provider may offer services of their own. For instance, a client of the network service provider may operate one or more application servers capable of providing users with a social networking service, an online banking service, a search engine service, etc.

In some implementations, in order to access the services, a user must first register for the service (e.g., create a user account). Once the user is registered for the service, the user may typically be required to complete a two-factor authentication process each time the user wants to access the service. As explained above, the two-factor authentication process may require a username and password to satisfy one factor of the authentication process and then another type of authentication information (e.g., a portion of the user's social security number, the maiden name of the user's mother, an appropriate MDN, etc.) to satisfy the second factor of the authentication process. In order to simplify the authentication process (from the perspective of the user) without having to forgo the security benefits of a two-factor authentication process, a client organization may register for an authentication support service that is provided by a network authentication server of the network service provider (at 1a). As described below, this may give users the option of whether to simplify the two-factor authentication process by permitting the network service provider to automatically provide some of the authentication information required by the two-factor authentication process.

In order to access the services provided by the client organization, a user may first register a user device (e.g., a smartphone, a tablet computer, etc.) with a network (e.g., a wireless telecommunications network) of the network service provider (at 2a). This may include communicating with one or more server devices of the network, which may include the network authentication server depicted in FIG. 1A. In doing so, the network may assign an Intent Protocol (IP) address to the user device (at 3a). Additionally, the network service provider may create a record of the IP address assigned to the user device so that the user device may be identified by the IP address (in addition to the MDN) of the user device.

The IP address may enable the user device to contact the client application server in order to register for the service offered by the client organization (at 4a). In some implementations, the client application server may receive (and store) the MDN of the user device when the user device is registered for the service offered by the client application server. During, or subsequent to, the user device registering for the service (at 4a), the user device may enable authentication support services offered by the network service provider (at 5a). As described above, the authentication support services may enable the user to complete the two-factor authentication process without having to provide information for the second factor of the two-factor authentication process. For instance, the client may only be required to enter information for one of the authentication factors (e.g., a username and password), and any additional information that is required for authentication (e.g., information for the second factor) may be provided by the network authentication server.

In response to the user device requesting that the authentication support services be enabled, the client application server may store information that identifies the user device (e.g., the MDN of the user device) (at 6a) and may communicate with the network authentication server to register the user device for the authentication support services (at 7a). As such, the user device, network authentication server, and application server may perform a series of setup or registration operations that may enable the network service provider to facilitate the two-factor authentication processes required by the client organization before the user device may access the application server.

As mentioned above, FIG. 1B may include an example of a two-factor authentication procedure using authentication support services. In order to gain access to services provided by the application server, the user device may access a webpage that prompts the user for authentication information (e.g., a username and password) that may correspond to the first factor of the two-factor authentication service (at 1b). In response to the user providing valid authentication information, the application server may send an authentication request to the user device (at 2b), which the user device may automatically forward or relay to the network authentication server (at 3b). The request may include identification information corresponding to the client application server. The request may include the IP address assigned to the user device, and as the request is relayed through the network to the network authentication server, the network may identify the MDN of the user device based on the IP address in the request, and insert the MDN into the request. The network authentication server may validate the request (based on the identification information corresponding to the client application information) and generate a one-time validation code (OTVC) using the MDN (at 4*b*). The network authentication server may send the OTVC to the user device (at 5*b*).

The user device may automatically forward the OTVC to the application server (at 6*b*), and the application server may respond by sending an authentication request (along with the OTVC) to the network authentication server (at 7*b*). Based on the information in the request, the network authentication server may validate the client organization and the OTVC (at 8*b*) and may send a copy of the MDN of the user device to the application server (at 9*b*). The copy of the MDN may correspond to the second factor of the two-factor authentication required by the application server. As such, the application server may compare the copy of the MDN with an MDN that the application server received from the user device previously (e.g., during the initial registration of the user device) (at 10*b*).

In some implementations, the network authentication server may communicate one or more types of user information (along with the MDN) to enable the application server to compare the MDN from the network authentication server with the appropriate MDN stored by the application server. For instance, the network authentication server may communicate a username associated with the MDN to the application server, and the application server may identify a stored MDN based on the username. The MDN received from the network authentication server may then be validated by comparing the received MDN with the MDN, stored by the application server, associated with the username. In some implementations, an IP address and port number used to send the request to authenticate the OTVC may be associated with user information (e.g., a username, an MDN, etc.), and network authentication server may use the IP address and port number to send the MDN to the client application server. In such implementations, the client application server may use the IP address and port number to identify the appropriate MDN to compare with the MDN received from the network authentication server.

When the MDNs match one another, the two-factor authentication requirement may be satisfied, and the application server may notify the user that he or she has been logged in and may access the requested service (at 11*b*). As such, techniques described herein may enable a user to complete a two-factor authentication requirement by providing authentication information corresponding to only one of the required factors. As described below, in some implementations, one or more encryption techniques may also be used to further ensure the security of the authentication support service enabled by the network authentication server.

Figure 2:
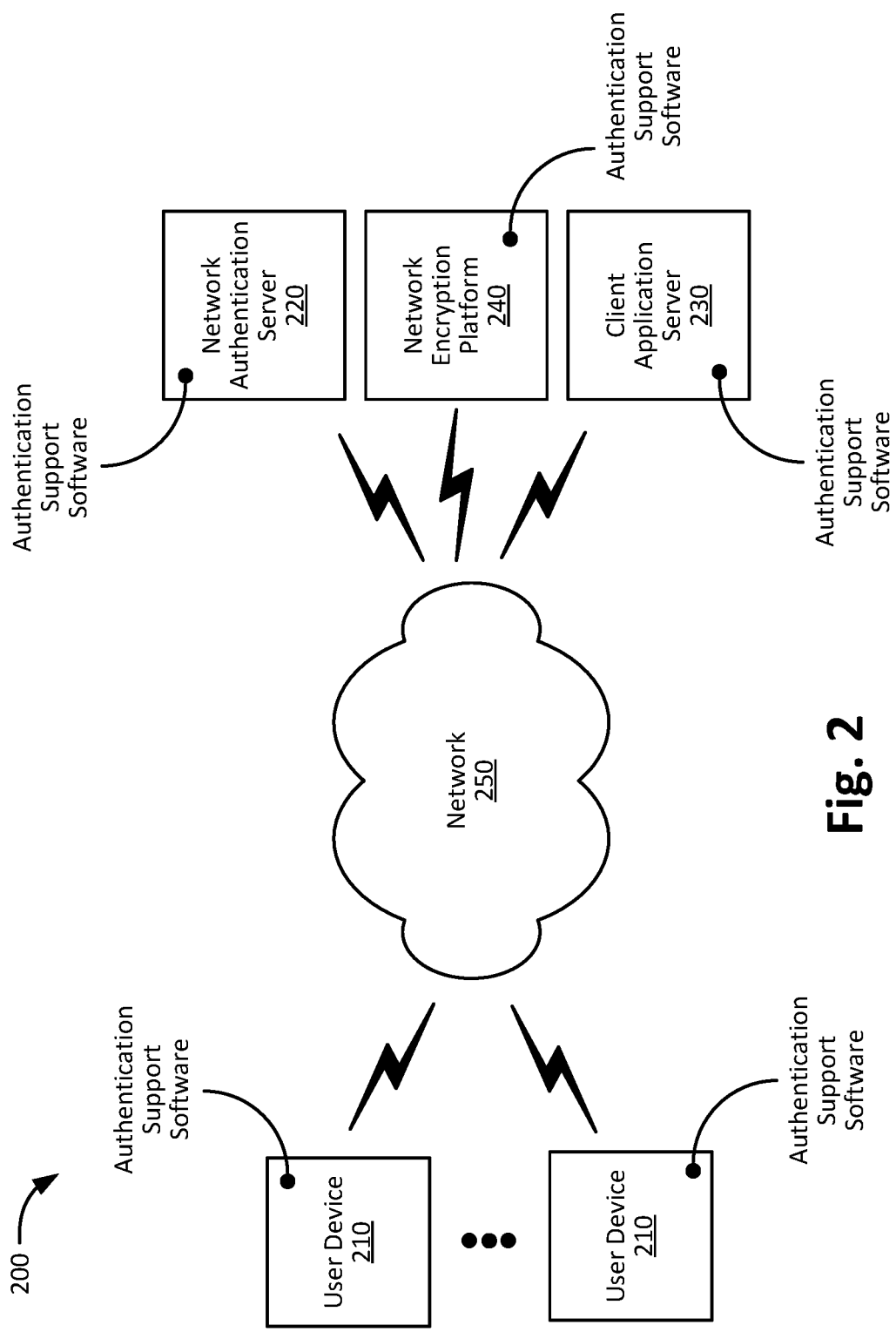
FIG. 2 is a diagram of an example environment in which systems and/or methods described herein may be implemented.

FIG. 2 is a diagram of an example environment 200 in which systems and/or methods described herein may be implemented. Environment 200 may include one or more user devices 210, network authentication server 220, client application server 230, network encryption device 240, and network 250.

User device 210 may include a portable computing and communication device, such as a personal digital assistant (PDA), a smart phone, a cellular phone, a laptop computer with connectivity to a cellular wireless network, a tablet computer, etc. User device 210 may also include non-portable computing devices, such as a desktop computer, a consumer or business appliance, or other devices that have the ability to connect to network 250. User device 210 may also include a computing and communication device that may be worn by a user (also referred to as wearable devices) as a watch, a fitness band, a necklace, glasses, an eyeglass, a ring, a belt, a headset, or another type of wearable device.

As depicted, user device 210 may include software, such as a user device version of authentication support software, that may enable user device 210 to perform one or more of the operations described herein, such as forwarding requests and information between network authentication server 220 and client application server 230. In some implementations, user device 210 may be capable of performing such operations without specialized software. For instance, an authentication request that is received from application server 230 but intended for network authentication server 220 may include a message (e.g., a Hypertext Transfer Protocol (HTTP) 302 Redirect message) that user device 210 is already capable of receiving, understanding, and heeding.

Network authentication server 220 may include one or more computing devices, such as a server device or a collection of server devices, capable of facilitating a two-factor authentication requirement by, for example, providing at least some of the required authentication information. In some implementations, network authentication server 220 may be owned and/or operated by a network service provider (e.g., an organization that operates a wireless telecommunications network, an Intent Service Provider (ISP) network, etc.). Additionally, network authentication server 220 may include, or otherwise have access to, one or more types of user information (e.g., user identification and/or authentication information) for users registered with the network service provider. Examples of such information may include user names, user street addresses, user device MDNs, IP addresses assigned to registered user devices, etc.

As depicted, network authentication server 220 may include software, such a network server version of authentication support software, which may enable network authentication server 220 to perform one or more of the operations described herein. For instance, the authentication support software may enable client application server 230 to register user device 210 for authentication support services, to encrypt and decrypt information for enhanced security, to generate and store certain types of authentication information, to communicate with user device 210 and client application server 230 at different times and in different ways, etc.

Client application server 230 may include one or more computing devices, such as a server device or a collection of server devices, capable of providing one or more services (e.g., a social networking service, a banking service, etc.) to user device 210, implementing a two-factor authentication service for accessing such services, registering user device 210 for such services, registering user device for authentication support services, etc. In some implementations, client application server 230 may be owned and/or operated by an organization (e.g., an academic institution, a research institution, a business, a government agency, etc.) other than the network service provider. Additionally, client application server 230 may include software, such application server version of authentication support software, which may enable network authentication server 220 to perform one or more of the operations described herein. For instance, the authentication support software may enable client application server 230 to enable the user to specify whether he or she would like to have authentication support services enabled, to send an authentication request to user device 210, to send a request to network authentication server 220 to verify certain information, and to determine whether authentication information (whether from user device 210 and/or network authentication server 220) is valid, etc.

Network encryption platform 240 may include one or more switches, routers, servers, and/or other network devices capable of relaying information from user device 210 to network authentication server 220 and of implementing one or more network security policies. Network encryption platform 240 may include software, such a version of authentication support software, which may enable network authentication server 220 to perform one or more of the operations described herein. For instance, the authentication support software may enable network encryption platform 240 to receive an authentication request from user device 210, determine the MDN of user device 210, encrypt the MDN, and insert the encrypted MDN into a header of the request before sending the request to network authentication server.

In some implementations, the authentication support service for a relative large network may be implemented by a single server device or a centralized group of server devices. In such implementations, network encryption platform 240 may be implemented by network devices throughout the network (e.g., at Radio Access Network (RANs) throughout the network) so that when an authentication request is received from user device 210, the MDN of the user device may be promptly identified, encrypted, and inserted into the request, before the authenticating request is forwarded on to a remotely located network authentication server 220. Doing so may increase security by ensuring that the MDN remains obfuscated (to unauthorized or malicious devices) as it pass through the network to network authentication server 220.

Network 250 may include one or more wired and/or wireless networks. For example, network 250 may include a cellular network (e.g., a second generation (2G) network, a third generation (3G) network, a fourth generation (4G) network, a fifth generation (5G) network, a LTE network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Figure 3:
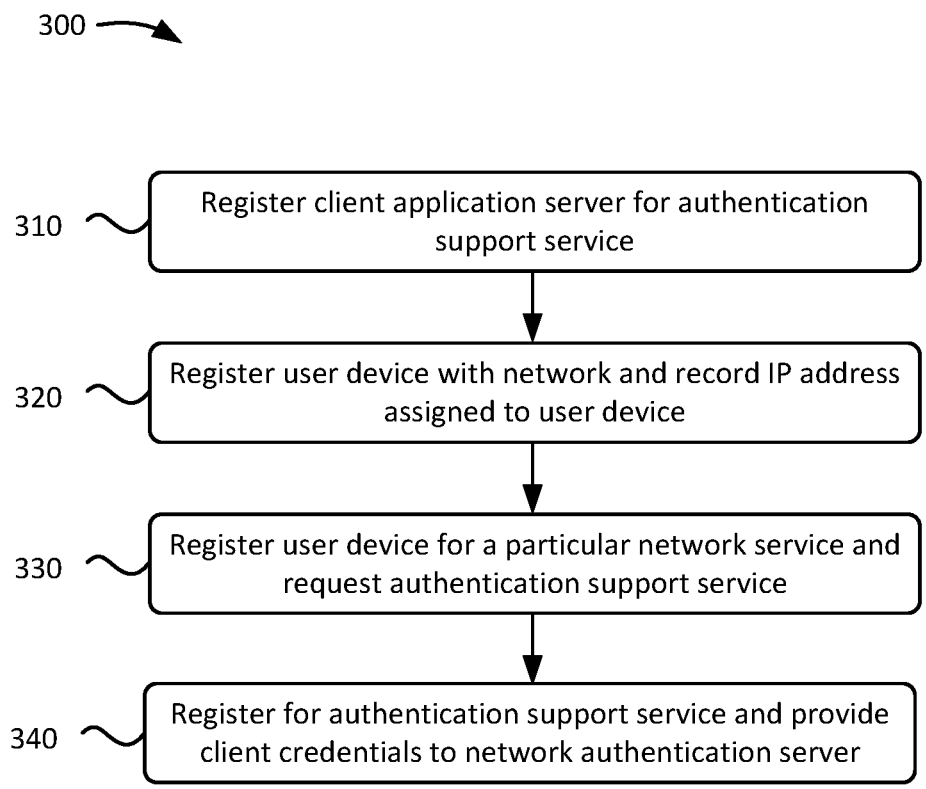
FIG. 3 is a flowchart diagram of an example process for setting up a two-factor authentication service.

FIG. 3 is a flowchart diagram of an example process 300 for setting up a two-factor authentication service. In some implementations, process 300 may be implemented by one or more of user device 210, network authentication server 220, and/or client application server 230.

As shown, process 300 may include registering client application server 230 for authentication support service (block 310). For instance, client application server 230 may communicate with network authentication server 220 (and/or another device of the network service provider) to register for authentication support services that may be provided by network authentication server 230. In some implementations, this may include completing an application that requires various types of information, such as information identifying the client (e.g., a client identifier (ID)), information identifying client application server 230, and security information (e.g., encryption keys) for communicating with client application server 230. Additional examples of such information may include an indication that client application server 230 implements a two-factor authentication process, information identifying the two-factor authentication process, information identifying a manner, format, and/or location (e.g., a callback URL) regarding how network authentication server should submit authentication information for the two-factor authentication process, etc.

Process 300 may include registering user device 210 with a network and recording an IP addressed assigned to user device 210 (block 320). For example, user device 210 may register with a wireless telecommunications network. In some implementations, this may include user device 210 establishing a wireless connection with a base station (e.g., an evolved Node B (eNB)) of the network and providing identification and/or authentication information to one or more core network devices of the wireless telecommunications network. In some implementations, user device 210 may be assigned an IP address by registering with the network, which user device 210 may use to communicate with one or more IP-based networks (such as a 4G network, the Internet, etc.).

In some implementations, a record of the IP address assigned to user device 210 may be created, such that network authentication server 220, network encryption platform 240, or another network device may readily identify user device 210 based on the IP address. For instance, the IP address may be associated with an MDN of user device 210. As such, network authentication server 220, network encryption platform 240, or another network device may determine the MDN of user device 210 based on data packets that user device 210 may use to communicate over an IP-based network.

Process 300 may include registering a user device for a particular network service and requesting that an authentication support service be enabled (block 330). For example, user device 210 may communicate with an application server (e.g., client application server 230) capable of providing a particular service via a wireless telecommunications network, the Internet, or another type of network. As noted above, examples of such services may include a social networking service, an email service, an instant messaging service, a banking service, a financial transactions service, an online auction service, an online retail service, an information forum, a search engine, a database, a legal service (e.g., a service that enables user to submit legal documents to court or other government entity), etc. In some scenarios, client application server 230 may require a user of the user device to create an account before being permitted to access the service. As such, user device 210 may provide client application server 230 with various types of user information, such as a name of the user, a username, a password, an email address, a MDN of user device 210, etc.

Additionally, the client application server 230 may enable the user to specify one or more settings that may customize the service (or the manner in which the service is provided) for the user. For instance, a search engine service may enable the user to specify what types of information (e.g., text, images, videos, document types, etc.) that the user would like to receive a search result, the number of results displayed per webpage, categories or databases of information that the user would like to have searched, etc. In some implementations, the user may be capable of specifying whether he or she would like to simplify the process of logging into the service by enabling the authentication support service described herein.

Process 300 may also include registering for the authentication support service and providing client credentials to network authentication server 220 (block 340). For example, in response to receiving an indication that the user wants the authentication support service, client application server 230 may register user device 210, for the authentication support service, with network authentication server 220. In some implementations, this may include informing network authentication server 220 that user device 210 has requested and authorized network authentication server 220 to assist with logging in user device 210 via the two-factor authentication service required by client application server 230. In some implementations, registering for the authentication support service may also include client application server 230 providing one or more types of information identifying user device 210. As described above, an example of such information may include the MDN of user device 210. In some implementations, client application server 230 may store a copy of the user device identification information provided to network authentication server so that, when authentication information regarding the registered user device 210 is later received from network authentication server 220, client application server 220 may validate the authentication information by comparing the copy of the information received with the copy of the information stored by client application server 230 at the time user device 210 was initially registered for the authentication support service.

Figure 4:
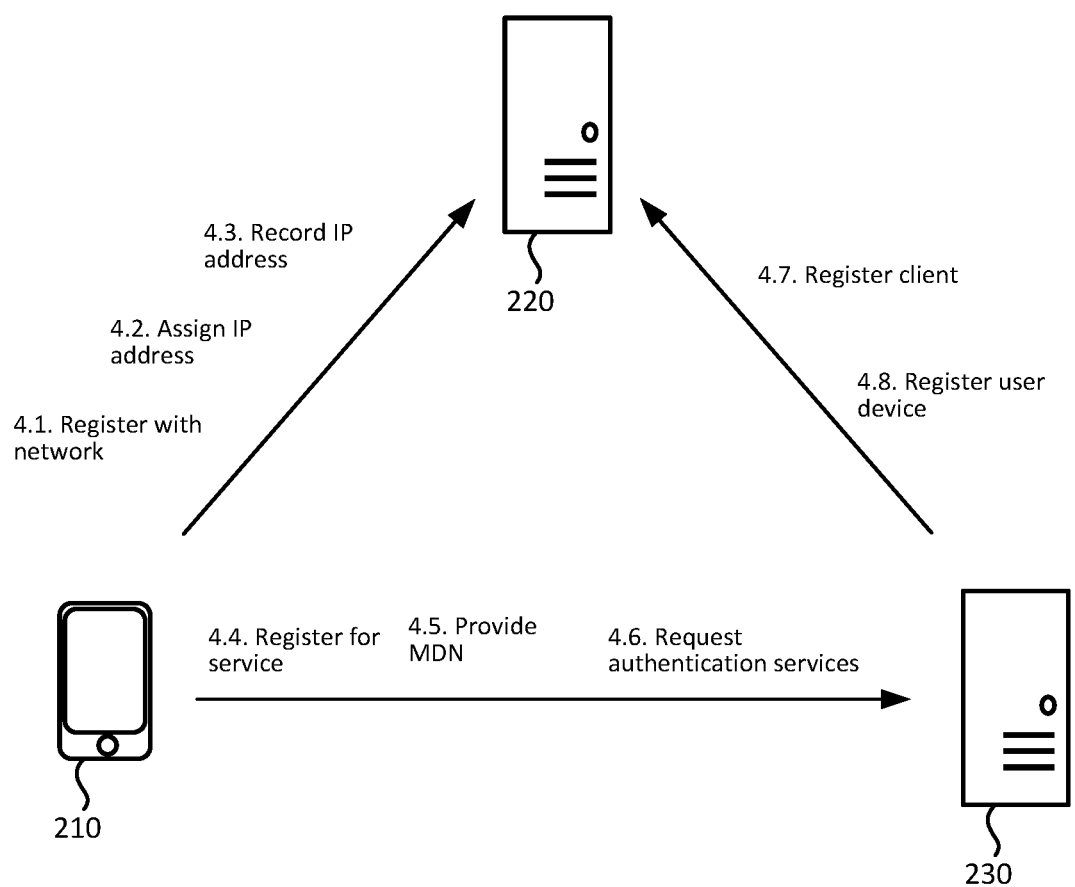
FIG. 4 is a data flow diagram of an example for enabling an authentication support service.

FIG. 4 is a data flow diagram of an example for enabling an authentication support service. As shown, FIG. 4 includes user device 210, network authentication server 220, and client application server 230. FIG. 4 also includes examples of operations (4.1-4.8) that may be performed in order to enable the authentication support service. In some implementations, an example for enabling an authentication support services may include fewer operations or devices, additional operations or devices, and/or alternative operations or devices than those depicted in FIG. 4.

As shown, user device 210 may register with a network (such as network 250) (at 4.1). User device 210 may be assigned an IP address that may be recorded by the network (e.g., by network authentication server 220) (at 4.2). Network authentication server 220 (and/or another device of the network) may record the IP address assigned to user device 210 (at 4.3). User device 210 may register for a service offered by client application server 230 (at 4.4). As part of the registration process, user device 210 may provide the MDN of user device 210 to client application server 230 (at 4.5). Additionally, user device 210 may enable authentication support services for accessing the services offered by client application server 230 (at 4.6).

In response to authentication support services being enabled, client application server 230 may register for authentication support services offered by network authentication server 220 (at 4.7). Client application server 230 may also provide network authentication server 220 with credentials, such as a client ID and a callback URL. The callback URL may correspond to a two-factor authentication process required by client application server 230 in order for user device to gain access to the services offered by client application server 230. Client application server 230 may also register user device 210 for authentication support services (at 4.8).

Figure 5:
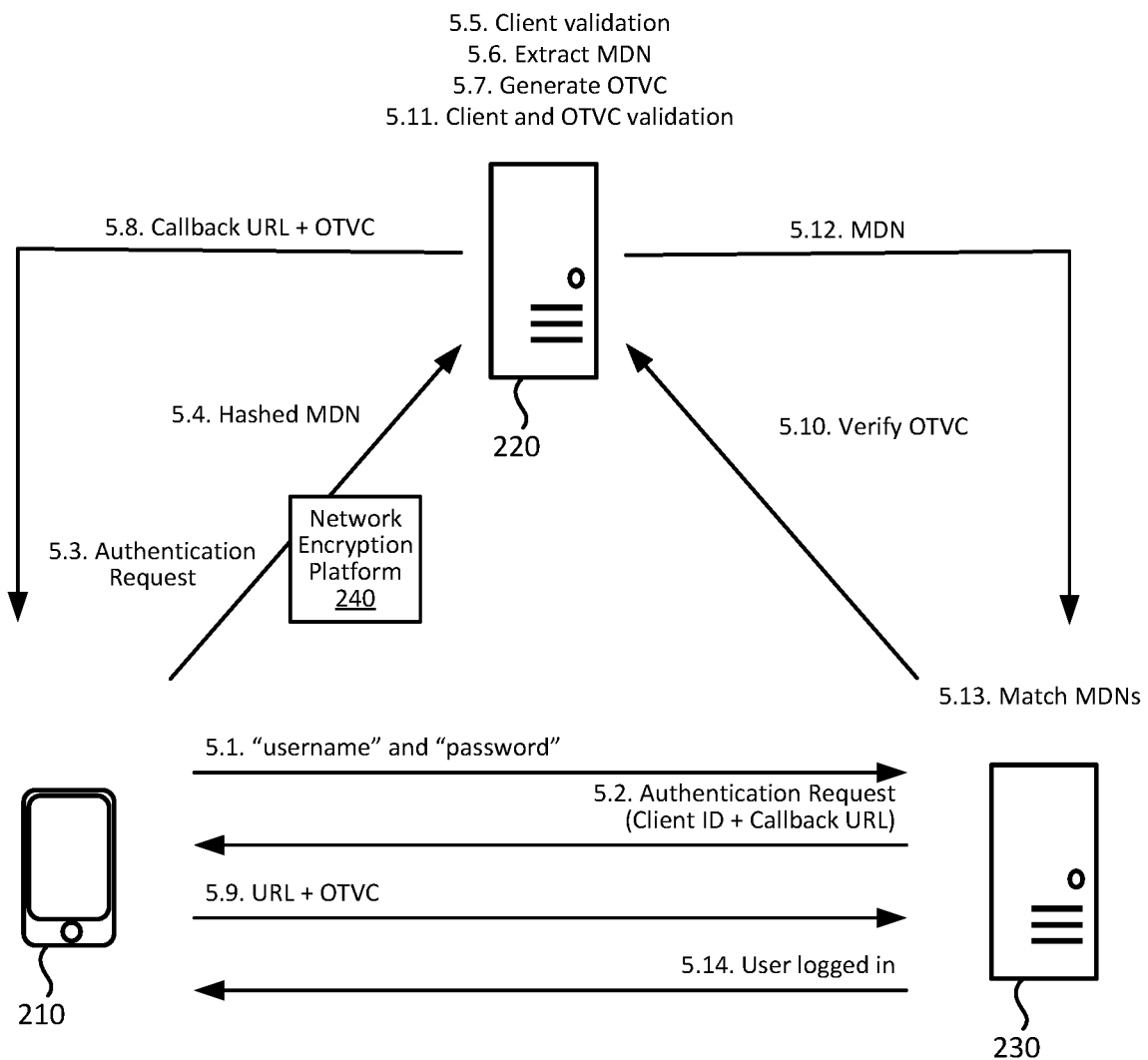
FIG. 5 is a data flow diagram of an example for providing authentication support services for a two-factor authentication service.

FIG. 5 is a data flow diagram of an example for providing authentication support services for a two-factor authentication service. As shown, FIG. 5 includes user device 210, network authentication server 220, client application server 230, and network encryption platform 240. FIG. 5 also includes examples of operations (5.1-5.14) that may be performed in order to provide authentication support services for a two-factor authentication service. In some implementations, an example for providing authentication support services for a two-factor authentication service may include fewer operations or devices, additional operations or devices, and/or alternative operations or devices than those depicted in FIG. 5.

For the purposes of explaining FIG. 5, assume that user device 210 has already registered with the network (e.g., network 250), the services offered by client application server 230, and that authentication support services have been enabled for user device 210 (as described above with reference to FIG. 4). As shown, user device 210 may attempt to log in to a service offered by client application server 230 by, for example, providing a username and password to client application server 230 (at 5.1). Client application server 230 may respond by sending user device 210 a request for authentication from the network (e.g., network authentication server 220) (at 5.2).

In some implementations, the request may include a Hypertext Transfer Protocol (HTTP) 302 Redirect message. The authentication request may include the client ID of client application server 230 (or the organization operating client application server 230). The authentication request may also include a callback URL of the service that user device 210 is attempting to access (or the webpage user device 210 used to provide the username and password).

In accordance with the redirect message, user device 210 may send a request to network authentication server 220 (at 5.3). The request to the network authentication server 220 may include an HTTP Get request and may include the client ID and callback URL received from client application server 230. The request may also include the IP address of user device 210. As the request passes from user device 210 to network authentication server 220, network encryption platform may intercept the request, identify the MDN of user device 210, encrypt a copy of the MDN (e.g., using a hashing function), and insert the encrypted MDN into a header of the request (at 5.4). In some implementations, instead of the MDN being identified by network encryption platform 240, network authentication server 220 may identify the MDN based on the IP address in the request.

In response to the request from user device 210, network authentication server 220 may validate the client ID to verify that client application server 230 is registered with network authentication server 220 (at 5.5). Network authentication server 220 may also decrypt the MDN, and generate a OTVC based on the MDN and the client ID (at 5.6 and 5.7). Network authentication server 220 may also send a redirect message (e.g., an HTTP Redirect message) to user device 210 (at 5.8). The redirect message may include the callback URL and the OTVC. In response to the redirect message from network authentication server 220, user device 210 may forward the callback URL and OTVC to client application server 230 (at 5.9). In some implementations, user device 210 may do so using an HTTP Get message.

Client application server 230 may communicate a request to authenticate user device 210 to network authentication server 220 (at 5.10). The request may include the client ID of client application server 230, a password (e.g., a client secret) of client application server 230, and the OTVC. Network authentication server 220 may validate the client credentials (e.g., the client ID and the client secret) and the OTVC (at 5.11). In response to the validation, network authentication server 220 may communicate the MDN of user device 210 to client application server 230 (at 5.12). In some implementations, network authentication server 220 may use an HTTP 200 OK message to send the MDN. Client application server 230 may use the MDN from the network authentication server 220 with an MDN received from user device 210 (from when user device 210 registered with client application server 230) (at 5.13). When the MDNs match, client application server 230 may respond to user device 210 with a notification that user device 210 has been successfully logged in (at 5.14).

In some implementations, a different type of information may be used as the second factor for the two-factor authentication process. Examples of such information may include a portion of a social security number of the user (e.g., the last four digits), a maiden name of the user's mother, a name of a first pet of the user, etc. In such scenarios, network authentication server 220 may provide the appropriate authentication information to client application server 230 (e.g., at 12) after user device 210 has been adequately authenticated by network authentication server 220. In some implementations, network authentication server 220 may simply provide an indication of the user device being validated (as opposed to, for example, actual user information such as, the MDN of user device 210, the last four digits of the social security number of the user, etc.) as the second factor in the two-factor authentication process. Additionally, client application server 230 may indicate, to the network authentication server 220, the type of information that is required to complete the two-factor authentication process. In some implementations, this may be done when client application server 230 registers for the authentication support services (e.g., FIG. 4, at 1), when client application server 230 registers user device 210 for the authentication support services (e.g., FIG. 4, at 8), when client application server 230 requests that the OTVC be verified (e.g., FIG. 5, at 10), or at another time.

Figure 6:
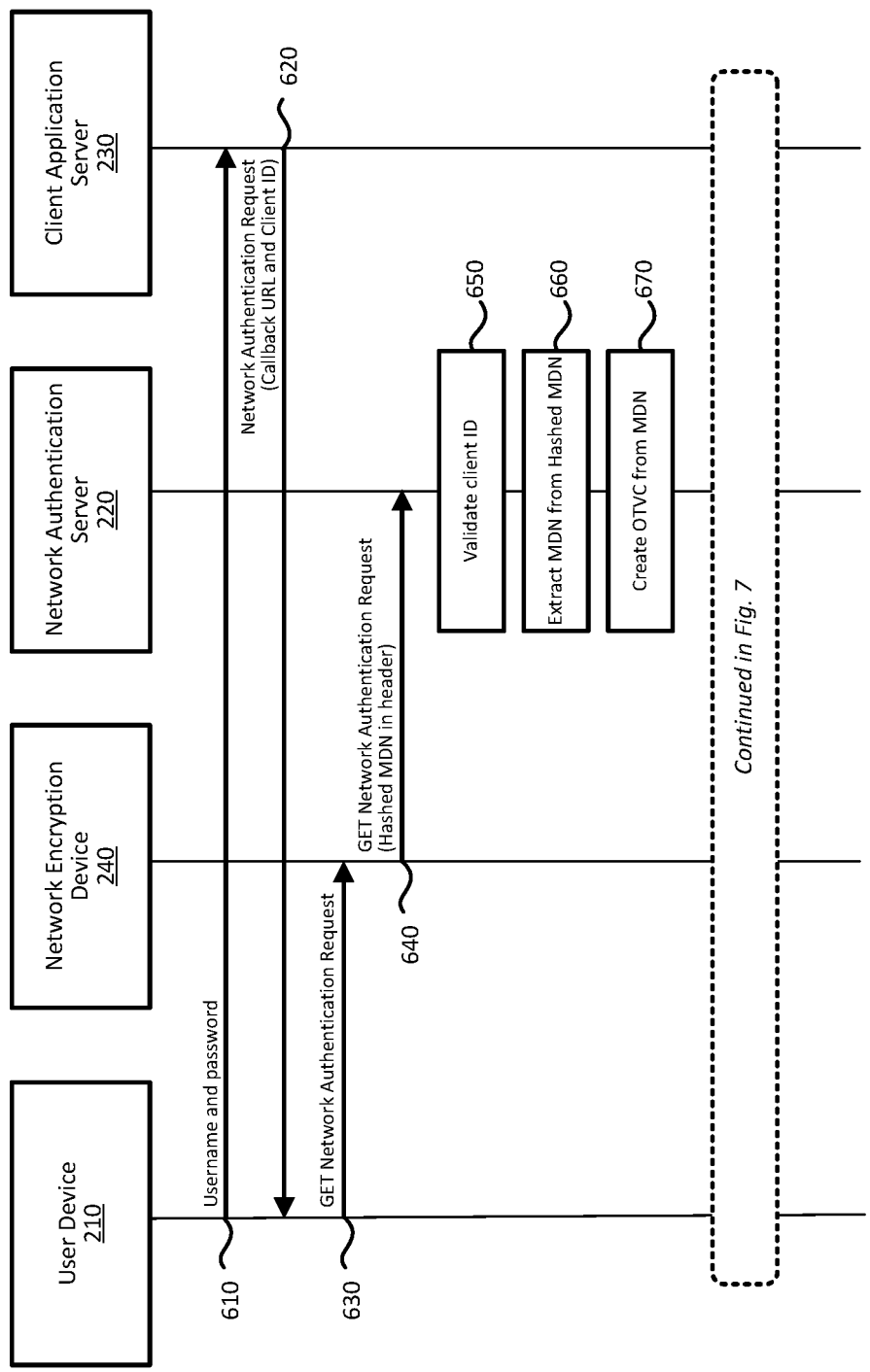
FIGS. 6 and 7 are sequence flow diagrams of an example implementation for providing authentication support services for a two-factor authentication service.
Figure 7:
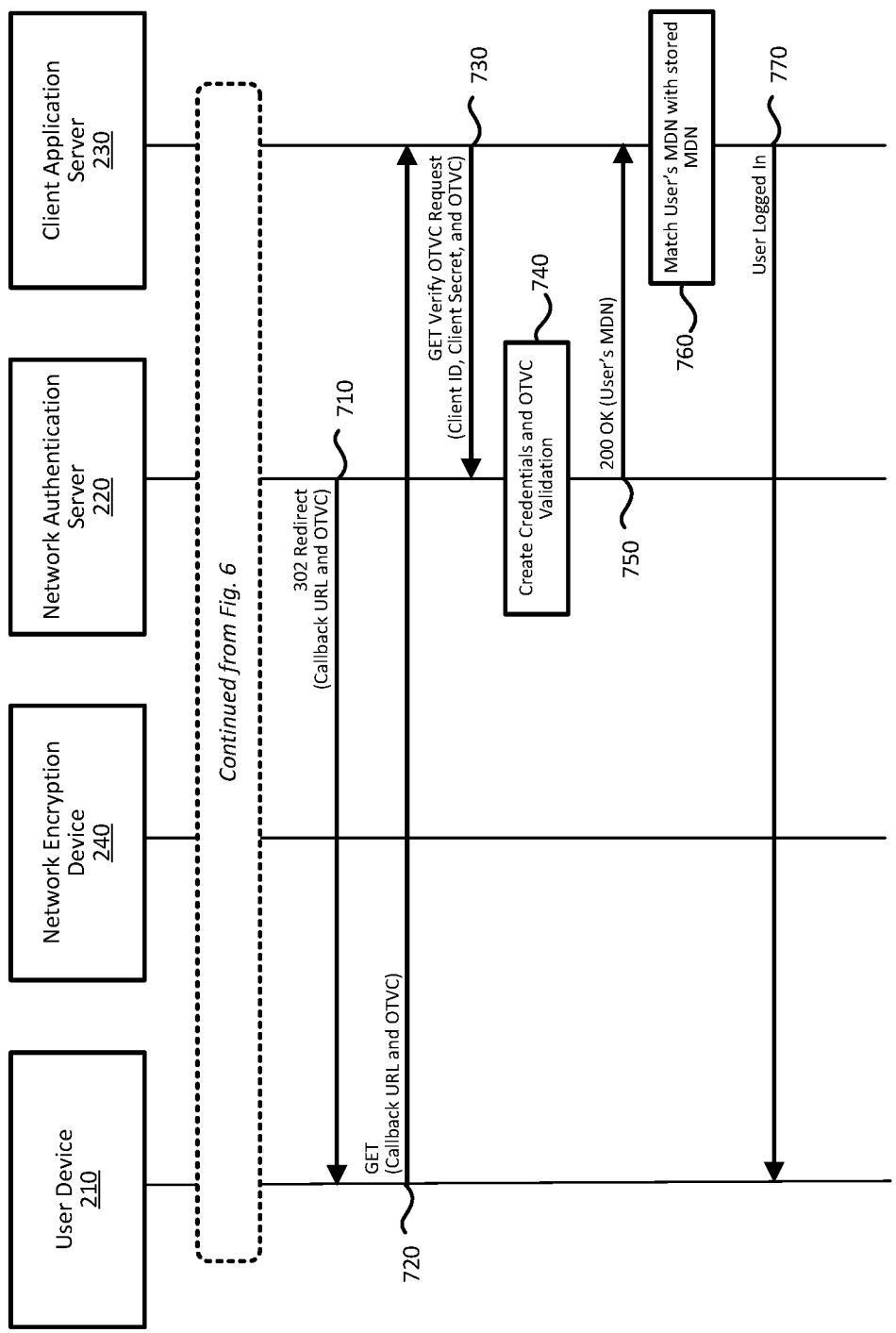

FIGS. 6 and 7 are sequence flow diagrams of an example implementation for providing authentication support services for a two-factor authentication service. As shown, FIG. 6 includes user device 210, network authentication server 220, client application server 230, and network encryption device 240. In some implementation, techniques for providing authentication support services may include additional, fewer, different, or differently arranged devices or operations.

As depicted, user device 210 may communicate user authentication information (e.g., a username and password) in order to login to client application server 230 (line 610). Client application server 230 may verify that the user authentication information is valid and respond by communicating a request to user device 210 to be authenticated by network authentication server 220 (line 620). The request may include a callback URL and client ID of client application server 230. User device 210 may relay the request to network encryption device 240 (line 630).

In some implementations, user device 210 may insert the MDN of user device 210 into the request. Network encryption device 240 may apply a hashing function to encrypt the MDN, insert the encrypted MDN into the header of the request, and forward the request to network authentication server 220 (line 640). As such, the request may include the client ID, the callback URL, and the encrypted MDN. Network authentication server 220 may validate the client ID, decrypt the MDN, and create an OTVC based on the client ID and the MDN (blocks 650, 660, and 670). As shown, the example implementation discussed above with reference to FIG. 6 is continued in FIG. 7.

Referring now to FIG. 7, network authentication server 230 may communicate a message to user device 210 that includes the callback URL of network authentication server 220 (line 710). The message may also include the OTVC. In some implementations, the message may include a HTTP 302 Redirect message. User device 210 may forward the message to client application server 230 (line 720). As mentioned above, the message may include an HTTP Get message, and may include the callback URL and OTVC. Client application serve 230 may respond by communicating a request to verify the identity of user device 210 (line 730). The message may include an HTTP Get message. The message may also include a client ID, a client secret (e.g., a password), and the OTVC.

Network authentication server 220 may validate the client credentials (e.g., client ID and password) of network authentication server 220 and the OTVC (block 740). Upon successful validation of the client credentials and the OTVC, network authentication server 220 may communicate the MDN of user device 210 to client authentication server 230 (line 750). In some implementations, network authentication server 220 may communicate the MDN using an HTTP 200 Ok message. Client application server 230 may validate user device 210 by comparing the newly received MDN with an MDN previously received by client application server 230. In response to a successful authentication of user device 210, client application server 230 may log user device 210 into client application server 230 and send a message to user device 210 regarding the successful login (line 770).

Figure 8:
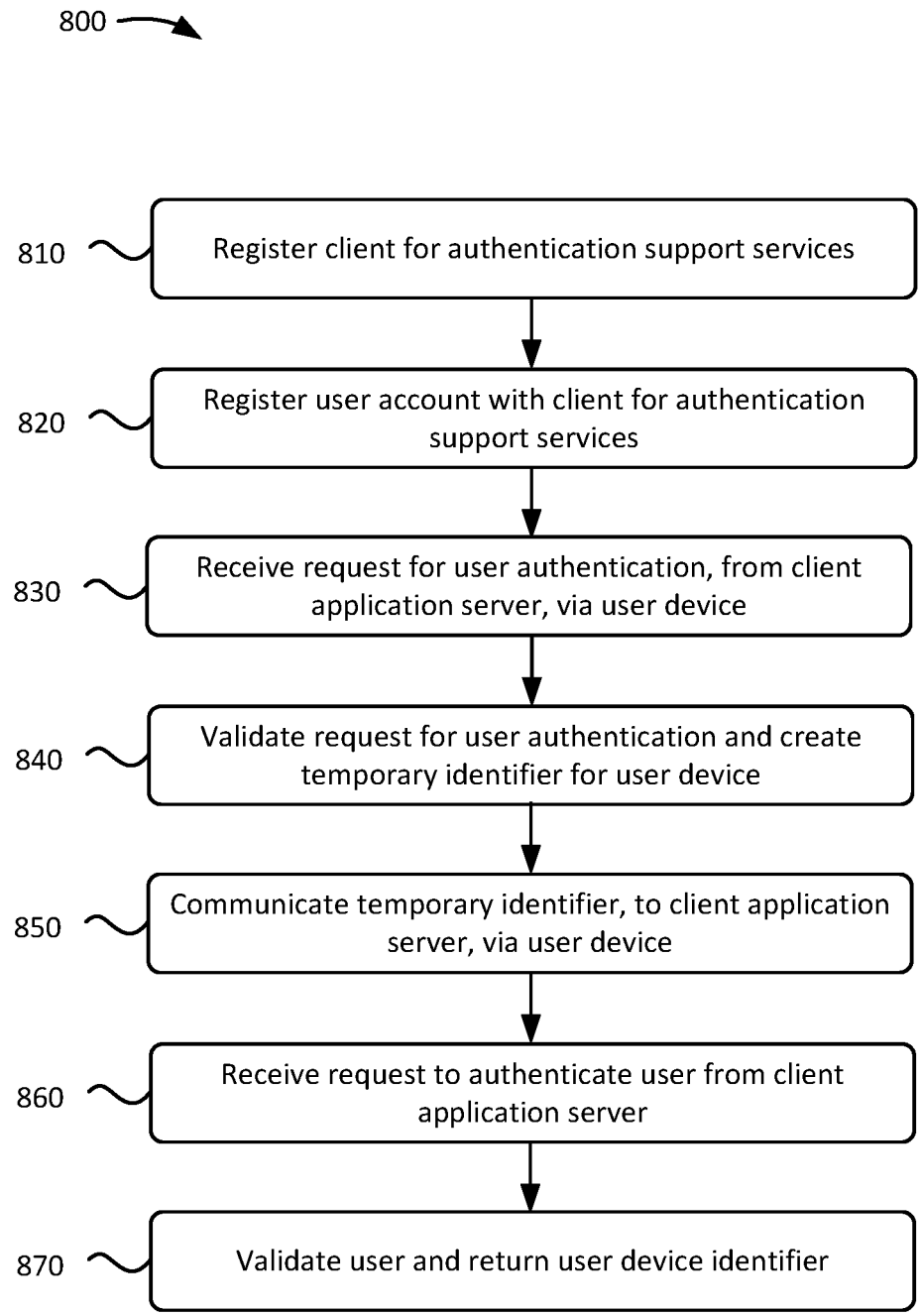
FIG. 8 is a flowchart diagram of an example process for providing authentication support services for a two-factor authentication service.

FIG. 8 is a flowchart diagram of an example process 800 for providing authentication support services for a two-factor authentication service. In some implementations, process 800 may be implemented by network authentication server 220.

As shown, process 800 may include registering client for authentication support services (block 810). For instance, client application server 230 may register with network authentication server 220 for an authentication support service that enables a user to login to client application server 230 with only a username and password (even though the client application server 230 includes a two-factor authentication service). Client application server 230 may provide network authentication server 220 with client credentials (e.g., callback URL and a client ID).

Process 800 may include registering a user's account with client for authentication support services (block 820). For example, network authentication server 220 may receive a notification from client application server 230 that a user of user device 210 would like to register for the authentication support services provided by network authentication server 220.

Process 800 may include receiving a request for user authentication from client application server 230 via user device 210 (block 830). For instance, client application server 230 may send a request to user device 210 for network authentication server 220 to validate user device 210. Additionally, user device 210 may forward the request to network authentication server 220 (which may include the callback URL, client ID, and the MDN of user device 210).

Process 800 may include validating request for user authentication and creating a temporary identifier for user device 210 (block 840). Network authentication server 220 may validate the request based on the client ID and create an OTVC based on the MDN of user device 210. In some implementations, the MDN may be encrypted (e.g., by network encryption platform 240) when received by network authentication server 220, and network authentication server 220 may decrypt the MDN prior to creating the OTVC.

Process 800 may include communicating temporary identifier to client application server 230 via user device 210 (block 850). Network authentication server 220 may send the OTVC to client application server 230 by sending the OTVC to user device 210. Network authentication server 220 may include the callback URL of client application server 230. User device 210 may relay the OTVC to client application server 230 in accordance with the callback URL Process 800 may include receiving request to authenticate user from client application server 230 (block 860). Network authentication server 220 may receive a request, from client application server, to authenticate user device 210. In some implementations, the request may include a copy of the client ID, a client password, and the OTVC.

Process 800 may include validating user and return user device identifier (block 870). Network authentication server 220 may validate the request based on the client ID and password (e.g., client secret). Network authentication server 220 may also validate the user based on the OTVC (e.g., by matching the created OTVC with the received OTVC). In some implementations, network authentication server 220 may return the actual MDN of user device 210 after validating client application server 230 and user device 210. Client application server 230 may validate user device 210 by comparing the received MDN with a stored MDN, and upon a successful validation, notify user device 210 that the user has been logged in.

In some implementations, a network authentication system (and/or an identity server) may register the application server for authentication support services in a manner similar to that described above with respect to in FIGS. 1A, 3, and 4. In yet another example, the network authentication system (and/or the identity server) may provide two-factor authentication support services to the application server in a manner similar to that described above with respect to in FIGS. 1B and 5-8.

Figure 9A:
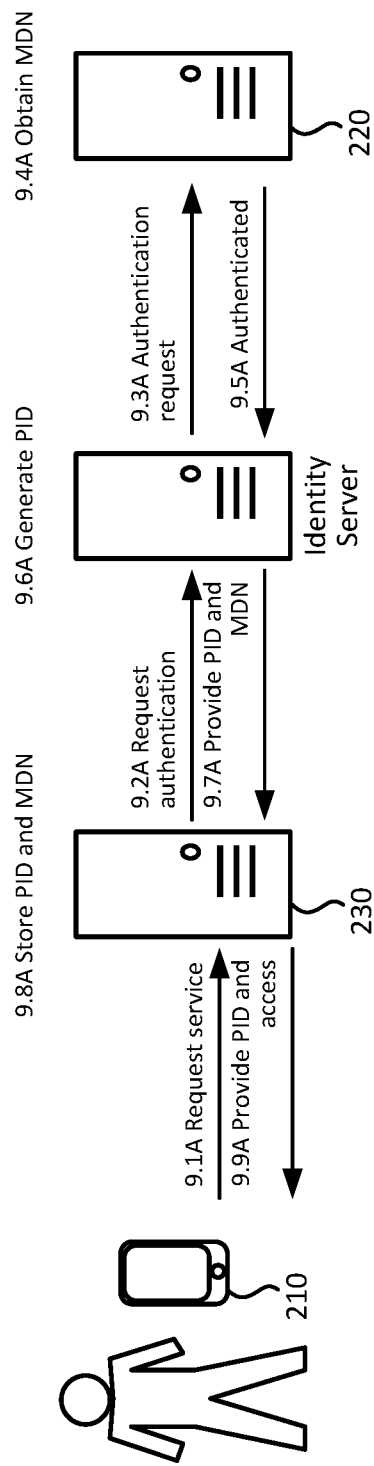
FIGS. 9A-9C illustrate an example overview of an implementation described herein.
Figure 9B:
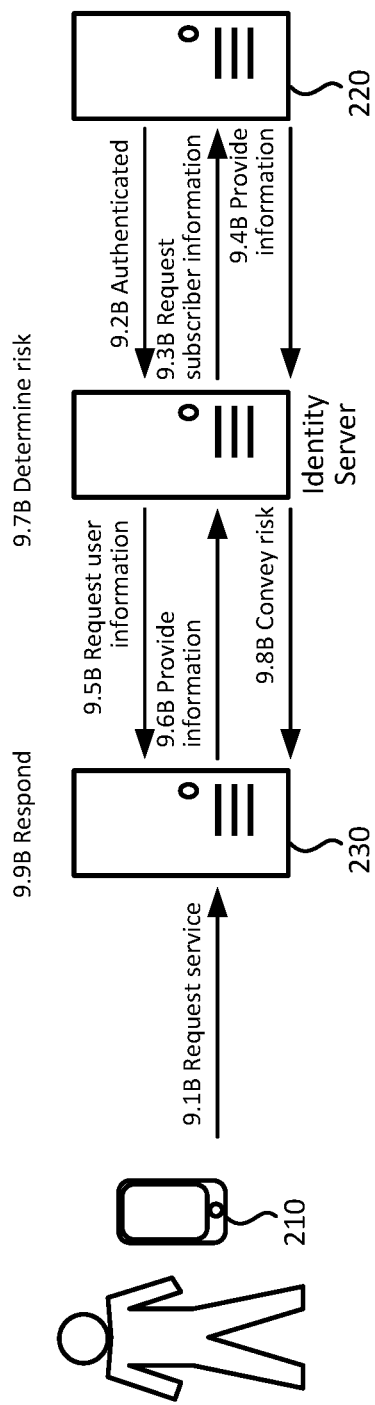
Figure 9C:
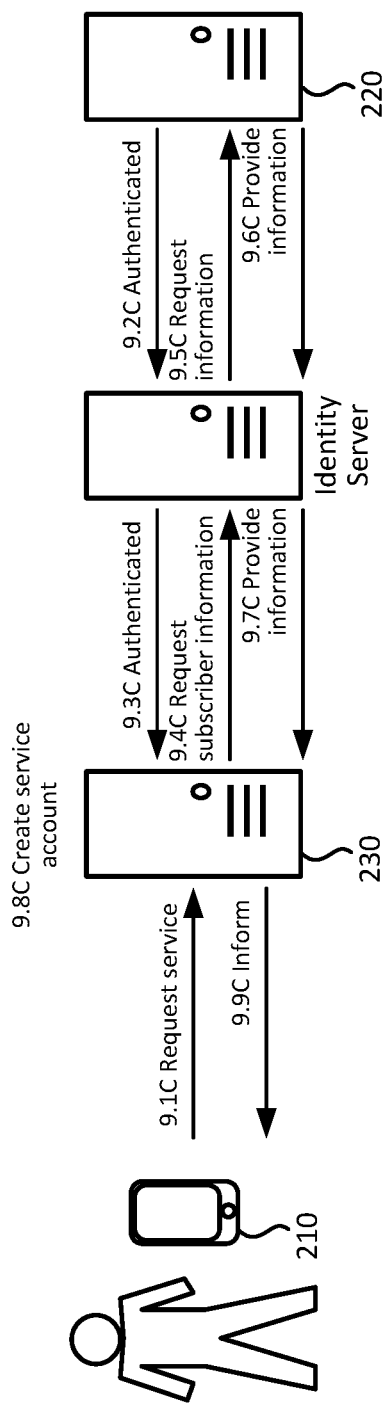

FIGS. 9A-9C illustrate an example overview of implementations described herein. As shown in FIG. 9A, a network authentication system may assist an application server by authenticating user devices. A user device may send a request to access a particular network service (e.g., a social networking service, an online banking service, etc.) to an application server that provides the service (at 9.1A). The application server may send a request, to an identity server, to have the user device authenticated (at 9.2A). The request may include information regarding the user device, such as an Internet Protocol (IP) address and/or a port number used to communicate the request. In response, the identity server may send an authentication request to the network application server (at 9.3A). While not shown in FIG. 9A, as described herein, the authentication request may be sent to the network authentication system via the user device. For example, the identity server may send the request to the user device using a redirect message that identifies the network authentication system as the destination for the request, which may cause the user device to send the authentication request to the network authentication system.

The network authentication system may obtain the MDN of the user device based on information in the authentication request, and may authenticate the user device based on the MDN (at 9.4A). In some implementations, authentication of the user device, by the network authentication system, may mean that the user device is known by, and is in good standing with, the network of the network authentication system (which may be, for example, a service provider network or another type of sizeable area network). After the network authentication system authenticates the user device, the network authentication system may provide a notification to the identity server that the user device has been authenticated, and (as shown) the notification may include the MDN of the user device (at 9.5A).

In response, the identity server may indicate, to the application server, that the user device has been authenticated. In some implementations, the identity server may generate a persistent identity (PID) based on the MDN (at 9.6A), and may provide the PID (and the MDN) to the application server (at 9.7A). In some implementations, the application server may store a copy of the PID and/or MDN for later use (at 9.8A). For example, the application server may provide a copy of the PID (along with access to the requested service) to the user device, and the user device may store the PID locally (e.g., as a cookie) (at 9.9A).

When the user later requests access to the service once again, the user device may provide the PID to the application server, the application server may compare the copy of the PID from the user device with the local copy of the PID, and determine whether to grant the user device access to the requested service based on whether the two PIDs match. The application server may also, or alternatively, use the MDN for subsequent authentication processes. For instance, the application server may associate the username and password provided by the user device (e.g., at 9.1A) with the MDN provided by the identity server. In such a scenario, the application server may authenticate a subsequent attempt by the user device to access the requested service if the user device provides the appropriate username, password, and MDN.

In some implementations, the authentication technique described in FIG. 9A may be an example of the two-factor authentication service describe above with respect to, for example, FIGS. 1B and 5-8. For instance, the user device requesting access to a service provided by the application server in FIG. 9A (e.g., at 9.1A) may be an example of the user device providing user authentication information to the client application server in FIG. 1B (e.g., at 1B). Additionally, the request from the user device in FIG. 9A may trigger the application server to initiate an additional authentication procedure (e.g., at 9.2A in FIG. 9 and at 2B in FIG. 1B), which may include obtaining additional authentication information in order to complete a two-factor authentication procedure required by the application server. The additional authentication information may include an MDN of the user device, which may be obtained by the application server from an external device (e.g., the authentication server of FIG. 1B (at 9B) or the network authentication system (via the identity server) of FIG. 9A at (9.5A-9.7A)).

As shown in FIG. 9B, a network authentication system may assist an identity server to determine whether the user device is a security threat to the application server. A user device may request access to a service provided by the application server (at 9.1B). As discussed above with reference to FIG. 9A, in response to the request, the application server, the identity server, and the network authentication system may communicate with one another to authenticate the user device, which may result in the network authentication system providing the identity server with a notification that the user device has been authenticated (which may include the verified MDN of the user device) (at 9.2B).

The identity server may perform one or more operations in order to determine whether the user device is a security threat to the application server. For example, the identity server may send a request to the network authentication system for subscriber information (at 9.3B), and the network authentication system may respond by providing the identity server with the subscriber information (at 9.4B). Examples of the subscriber information may include a first name, a last name, a street address, a billing address, an email address, payment information, etc. The identity server may also send a request to the application server for user information corresponding to the user device (at 9.5B), and the application server may respond by providing the identity server with the user information (at 9.6B). The user information from the application server may be the same type of information as the subscriber information from the network authentication system. In some implementation, the terms "subscriber information" and "user information" may be used interchangeably.

The identity server may determine whether the user device is a security risk based on a comparison of the two sets of user information (i.e., by comparing subscriber information, from network authentication system, to user information from the application server (at 9.7B)). For example, if the two sets of information match, the identity server may determine that the user device does not present a significant security risk to the application server. However, if the two sets of information are different, the identity server may determine that the user device presents a security risk (or a potential security risk) to the application server. The identity server may convey an indication regarding the security risk to the application server (at 9.8B), and the application server may respond accordingly (at 9.9B). For instance, if the user device is not a security risk, the application server may grant the user device access to the requested service. However, if the user device is a security risk, the application server may prohibit the user device from accessing the requested service. In some implementations, the application server may respond to the user device being a potential security risk by, for example, initiating a two-factor authentication procedure, such as the two-factor authentication procedure described above with reference to FIGS. 1B and 5-8.

As shown in FIG. 9C, a network authentication system may assist an application server by providing subscriber information to an application server (e.g., via an identity server) for automatically creating a service account for a user. The user device may send a request to the application server for access to a particular service (at 9.1C). As discussed above with reference to FIG. 9A, in response to the request, the application server, the identity server, and the network authentication system may communicate with one another to authenticate the user device, which may result in the network authentication system informing the identity server that the user device has been authenticated (at 9.2C), and the identity server may likewise inform the application server that the user device has been authenticated (at 9.3C).

As shown in FIG. 9C, the application server may send a request for subscriber information (corresponding to the user device) to the identity server (at 9.4C), and the identity server may forward the request to the network authentication server (at 9.5C). In response to the request, the network authentication server may retrieve the subscriber information requested and send the subscriber information to the application server via the identity server (at 9.6C and 9.7C). As mentioned above, examples of the subscriber information may include a first name, a last name, a street address, a billing address, an email address, payment information, etc.

Additionally, the application server may use the subscriber information to automatically create a service account for the user of the user device (at 9.8C). An example of a service account may include an account whereby the user may access an online banking service, an email service, an instant messaging service, a social networking service, or an account corresponding to another type of network service offered by the application server or by another application server. In other examples, the application server may use the subscriber information to automatically register the user device for a service, to fill out an electronic application, an electronic purchase order, or other type of electronic form, to setup a payment or another type of financial transaction, etc. The application server may also inform the user of the services automatically provided by the application server, which may include a description of the service provided, an operation to accept the service, an option to cancel or decline the service, etc. (at 9.9C).

Figure 10:
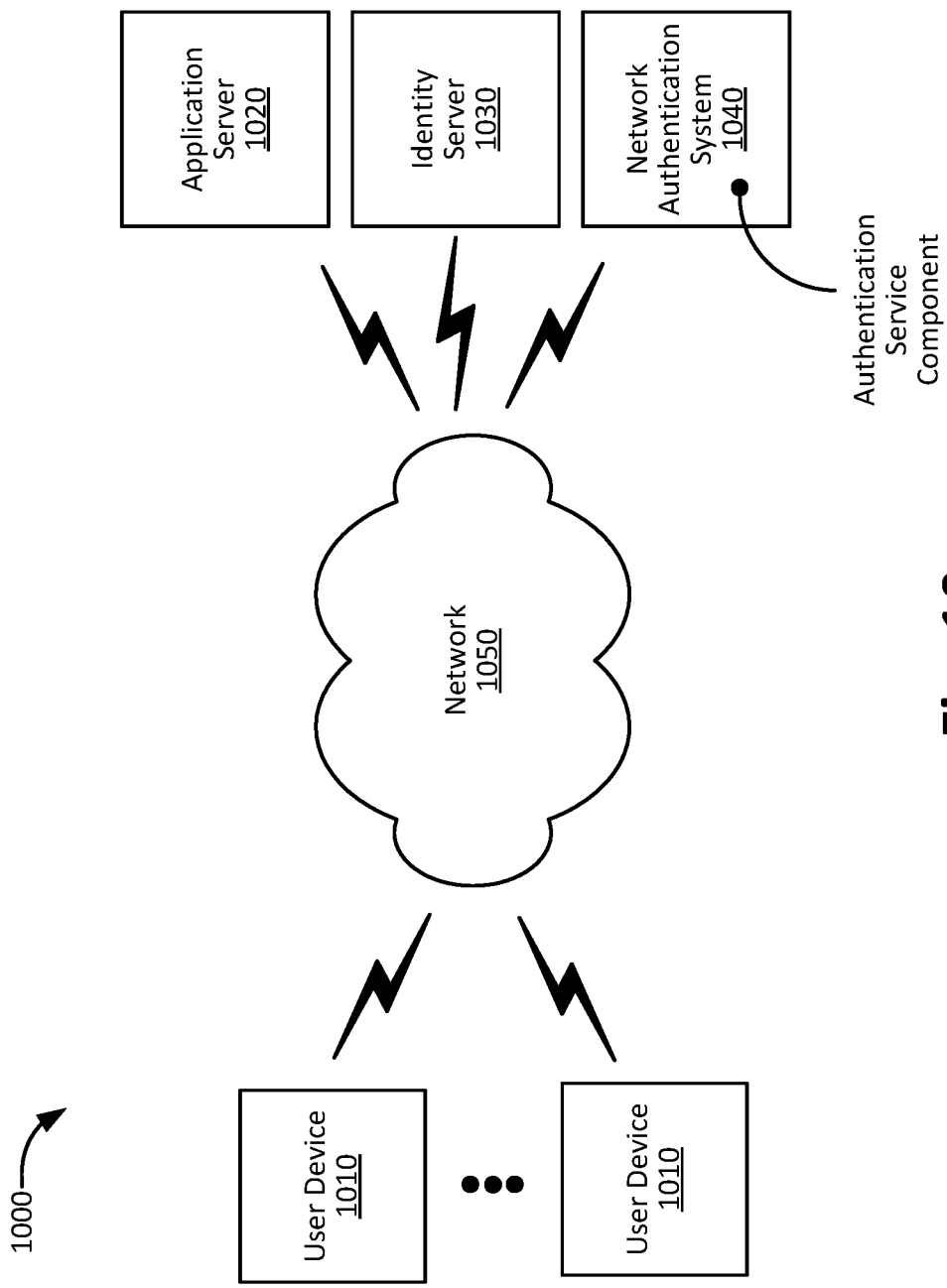
FIG. 10 is a diagram of an example environment in which systems and/or methods described herein may be implemented.

FIG. 10 is a diagram of an example environment 1000 in which systems and/or methods described herein may be implemented. Environment 1000 may include one or more user devices 1010, application server 1020, identity server 1030, network authentication system 1040, and network 1050. As described below with reference to FIG. 11, network authentication system 1040 may include multiple physical devices and/or logical components that correspond to a service provider network.

User device 1010 may include a portable computing and communication device, such as a personal digital assistant (PDA), a smart phone, a cellular phone, a laptop computer with connectivity to a cellular wireless network, a tablet computer, etc. User device 1010 may also include non-portable computing devices, such as a desktop computer, a consumer or business appliance, or other devices that have the ability to connect to network 1050. User device 1010 may also include a computing and communication device that may be worn by a user (also referred to as wearable devices) as a watch, a fitness band, a necklace, glasses, an eyeglass, a ring, a belt, a headset, or another type of wearable device.

As described herein, the authentication of user device 1010 may include user device 1010 sending a request to application server 1020 for access to one or more network services offered by application server 1020. Additionally, as described in greater detail below, user device 1010 may send and/or receive information that may be part of the authentication of user device 1010. For example, user device 1010 may receive a redirect message from one network device that may cause user device 1010 to communicate with another network device. Examples of such network devices may include application server 1020, identity server 1030, network authentication system 1040, etc.

Application server 1020 may include one or more computing devices, such as a server device or a collection of server devices, capable of providing a network service (e.g., an online banking service, an email service, an instant messaging service, a social networking service, etc.) to user devices 1010. Application server 1020 may also, or alternatively, initiate one or more authentication procedures before providing user device 1010 with access to the network service. Application server 1020 may also provide user information, corresponding to a particular user device 1010, to enable identity server 1030 to determine whether user device 1010 is a security threat. In some implementations, the user information may include information about a user that has an account with application server 1020, is registered for the service provided by application server 1020, or is otherwise known to application server 1020. Additionally, application server 1020 may obtain user information from network authentication system 1040 (or another network device) and automatically create a service account (or provide another automated service) based on the user information.

Identity server 1030 may include one or more computing devices, such as a server device or a collection of server devices, capable of communicating with network authentication system 1040 to authenticate user device 1010 for application server 1020. Identity server 1030 may also, or alternatively, determine whether user device 1010 is a security threat to application server 1020. As described herein, identity server 1030 may do so by, for example, comparing subscriber information from network authentication system 1040 with user information from application server. Identity server 1030 may also obtain subscriber information from network authentication system 1040 and provide the user information to application server 1020, which may enable application server 1020 to automatically create a service account (or to perform another automated service) for user device 1010.

In some implementations, identity server 1030 may be owned and operated by an organization that provides authentication support services to multiple application servers 1020. In some implementations, the authentication support services may vary depending on the security needs, requirements, or preferences of a particular application server 1020 and/or a particular user device 1010. For instance, when user device 1010 is associated with the same network service provider as network authentication system 1040, identity server 1030 may communicate with network authentication system 1040 when providing the authentication support services. By contrast, when user device 1010 is associated with another network service provider, identity server 1030 may provide the authentication support services without involving network authentication system 1040 and/ or other external devices.

Network authentication system 1040 may include one or more computing devices, such as a server device or a collection of server devices, capable of authenticating user device 1010. In some implementations, an authentication of user device 1010 by network authentication system 1040 may indicate that, for example, user device 1010 is known to, has a good reputation with, and/or is in good standing with a network of network authentication system 1040. In some implementations, network authentication system 1040 may also provide user information, corresponding to user device 1010 to identity server 1030 and/or application server 1020. The user information may be used by identity server 1030 to determine whether user device 1010 is a security threat to application server 1020, and/or used by application server 1020 to automatically create a service account (and/or to provide another type of automated service) for user device 1010.

As described herein, network authentication system 1040 may include a single server device or a plurality of server devices that may each have different network functionalities. For example, network authentication system 1040 may include a server capable of determining an MDN of user device 1010 base on a request to authenticate user device 1010. As another example, network authentication system 1040 may include a server that is capable of validating that a message is from application server 1020 or identity server 1030. In yet another example, network authentication system 1040 may include a server capable of managing encryption keys for devices within a network (e.g., network 1050), creating temporary authorization codes for user device 1010, creating tokens that correspond to user devices 1010, etc. In some implementations, network authentication system 1040 may be owned and operated by a network service provider or another type of organization that owns and operates a network providing network connectivity to user devices 1010.

Network 1050 may include one or more wired and/or wireless networks. For example, network 1050 may include a cellular network (e.g., a second generation (2G) network, a third generation (3G) network, a fourth generation (4G) network, a fifth generation (5G) network, a LTE network, a global system for mobile (GSM) network, a code division multiple access (CDMA) network, an evolution-data optimized (EVDO) network, or the like), a public land mobile network (PLMN), and/or another network. Additionally, or alternatively, network 1050 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Figure 11:
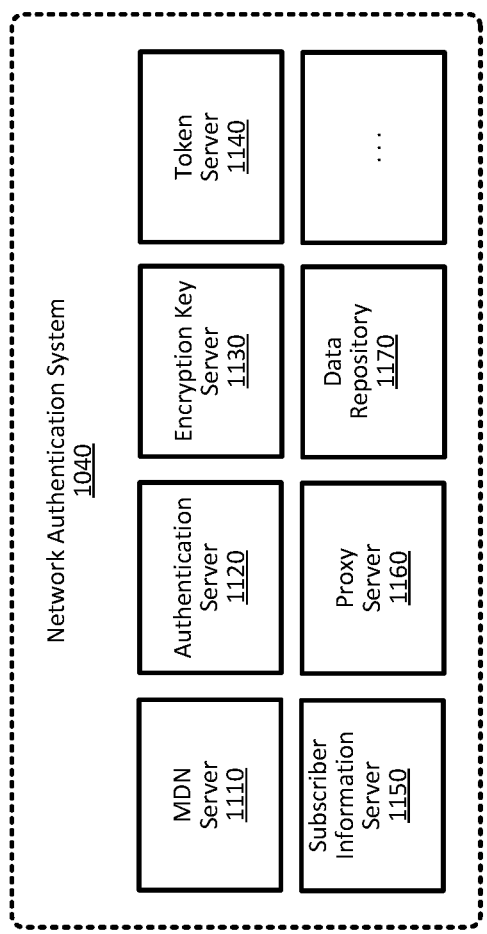
FIG. 11 is a block diagram of an example of a network authentication system.

FIG. 11 is a block diagram of an example of network authentication system 1040. As shown, network authentication system 1040 may include MDN server 1110, authentication server 1120, encryption key server 1130, token server 1140, subscriber information server 1150, proxy server 1160, data repository 1170, and/or additional or alternative network devices. As described below, each server or device of network authentication system 1040 may perform a distinct role in authenticating user device 1010 and/or providing user information for security threat analysis or automatic service account creation. In some implementations, the servers used to implement network authentication system 1040 (e.g., MDN server 1110, authentication server 1120, encryption key server 1130, token server 1140, subscriber information server 1150, proxy server 1160, etc.) may each be one or more hardware device. Additionally, or alternatively, the functions and operations described herein as being performed by network authentication system 1040 (and/or a one or more of the servers used to implement the network authentication system 1040) may be performed by logic of one or more hardware devices.

MDN server 1110 may include one or more computing devices, such as a server device or a collection of server devices, capable of receiving an authentication request (e.g., from user device 1010) and determining an MDN of user device 1010 based on the authentication request. For example, when user device 1010 initially obtains network access (e.g., to network 1050), MDN server 1110 (and/or another device of network 1050) may assign an IP address to user device 1010 and/or create a record that associates the MDN of user device 1010 with the newly assigned IP address. In some implementations, the MDN and IP address may also be associated with a particular port, such as a port that is pre-selected for receiving authentication requests from user device 1010. Consequently, while the authentication request from user device 1010 may not include the MDN of user device 1010, MDN server 1110 may determine the MDN of user device 1010 based on the IP address (and/or port number) used by user device 1010 to send the request to network authentication system 1040).

In some implementations, user device 1010 may have been assigned multiple IP addresses, and one or more of the assigned IP addresses may be assigned to (or otherwise associated with) a particular application (or another type of software) installed on user device 1010. In such a scenario, when user device 1010 executes the application, user device 1010 may use the corresponding IP address to access network 1050. In a similar manner, user device 1010 may also, or alternatively, be configured (or instructed) to use a particular port when communicating an authenticating request. In some implementations, the port may be provided to user device 1010 when user device 1010 is assigned an IP address from network 1050. In some implementations, the port may also, or alternatively, be specified by an application (or another type of software) installed on user device 1010. As such, in some implementations, user device 1010 may use a pre-selected IP address and/or port to send an authentication request to network authentication system 1040, and network authentication system 1040 may use the IP address and/or port to determine the MDN of user device 1010. Additionally, or alternatively, MDN server 1110 may encrypt the MDN and/or provide the MDN to authentication server 1120 (e.g., by including the encrypted MDN in a header of an authorization request sent to authentication server 1120).

Authentication server 1120 may include one or more computing devices, such as a server device or a collection of server devices, capable of authenticating user device 1010 based on a variety of authentication-oriented operations. For example, authentication server 1120 may receive an authorization request from MDN server 1110, validate the authorization request based on identification information (of identity server 1030) included in the authorization request, extract and decrypt the MDN from the authorization request, generate a temporary authorization code based on the MDN, and/or send the temporary authorization code to user device 1010. The temporary authorization code may be returned by identity server 1030 (e.g., as opposed to user device 1010), and authentication server 1120 may authenticate user device 1010 by, for example, comparing the temporary authorization code sent to user device 1010 with the temporary authentication code received from identity server 1030. Additional examples and details, regarding the authentication of user device 1010, are provided below with reference to FIGS. 12, 13, and 17-19.

Encryption key server 1130 may include one or more computing devices, such as a server device or a collection of server devices, capable of managing and maintaining encryption keys for a particular network (e.g., network 1050). In some implementations, MDN server 1110 may encrypt the MDN of user device 1010 based on an encryption key obtained from encryption key server 1130. Similarly, in some implementations, authentication server 1120 may decrypt the MDN of user device 1010 based on an encryption key (e.g., a copy of the same encryption key used by MDN server 1110) obtained from encryption key server 1130.

Token server 1140 may include one or more computing devices, such as a server device or a collection of server devices, capable of receiving a request, from identity server 1030 for an identity token corresponding to user device 1010. Token server 1140 may cause the request to be authenticated by authorization server 1120, generate the identity token requested, and/or provide the identity token to identity server 1030. The identity token may include a data structure used to send the MDN of user device 1010 from network authentication system 1040 to identity server 1030 in a manner that is secure and authenticatable by identify server. As such, the identity token may include an encrypted data structure with an MDN of user device 1010 and an indication of the authenticity and/or origin of the data structure (e.g., a digital signature of network authentication system 1040).

Subscriber information server 1150 may include one or more computing devices, such as a server device or a collection of server devices, capable of managing and/or maintaining information corresponding to one or more users. In some implementations, the users may include subscribers to a network service provider and the information may include subscriber information, a first name, a last name, an email address, a street address, an MDN, etc. Subscriber information server 1150 may receive a request, from identity server 1030, for information corresponding to user device 1010 (and/or a user of user device 1010). In response to the request, subscriber information server 1150 may send the requested subscriber information to identity server 1030.

Proxy server 1160 may include one or more computing devices, such as a server device or a collection of server devices, capable of operating as a proxy device for one or more of the other servers or devices of network authentication system 1040. For example, proxy server 1160 may receive information from one source (e.g., an authorization request from MDN server 1110) and may route, relay, or otherwise provide the request to the intended recipient (e.g., authentication server 1120). Data repository 1170 may include one or more computing devices, such as a server device or a collection of server devices, capable of managing and maintaining one or more types of information of relating to user devices 1010. For example, when user device 1010 is assigned an IP address by, for example, network 1050, data repository 1170 (or another device, such as MDN server 1110, subscriber information server 1150, etc.) may maintain a record that associates the assigned IP address with an MDN of user device 1010. Doing so may, for example, enable MDN server 1110 to determine the MDN of user device 1010 based on an authentication request from user device 1010 since the authentication request may include the IP address of user device 1010.

As such, the techniques described herein provide for a solution to obtaining an MDN of user device 1010 without having to communicate with a server or another type of network device that is outside the management and control of, for example, a network service provider. As such, the term "in-network" as used herein may include communications and/or other operations that take place between servers and/or devices owned, operated, and/or managed by a single network service provider or other entity. For instance, in implementations where authentication system 1040 is owned and operated by a single network service provider, communications between the servers and/or devices of authentication system 1040 may be in-network communications.

Accordingly, network authentication system 1040 may enable a single entity (such as a network service provider) to more securely and efficiently provide authentication and security services to outside entities (e.g., application server 1020, identity server 1030, etc.). For example, network authentication system 1040 may authorize user device 1010 for an external network service (e.g., a service offered by application server 1020) without having to provide any subscriber information (e.g., subscriber information stored in a Home Subscriber Server and/or Authentication, Authorization, and Accounting (HSS/AAA) server, a subscriber profile repository ("SPR"), and/or another type of internal device) to application server 1020 or identity server 1030. In another example, in addition to authenticating user device 1010, network authentication system 1040 may also authenticate identity server 1030 and/or application server 1020, which may enable network authentication system 1040 to securely provide subscriber information, corresponding to user device 1010, to application server 1020 and/or identity server 1030 (e.g., to enable application server 1020 to automatically create a user account for the user of user device 1010, to enable identity server 1030 to better evaluate whether user device 1010 poses a security threat to application server 1020, etc.).

In some implementations, the servers and devices of network authentication system 1040 may be arranged in various ways within a network (e.g., network 1050). For example, MDN server 1110, proxy server 1160 and/or data repository 1170 may be regional devices such that the network may include multiple MDN servers 1110, proxy servers 1160 and/or data repositories 1170 strategically positioned throughout the network. By contrast, in some implementations, authentication server 1120, encryption key sever 1130 token server 1140, and subscriber information server 1150 may be centrally located within the network. In such implementations, since an authentication request message sent from MDN server 1110 to authentication server 1120 may traverse a significant distance and/or network devices, encrypting the authorization request message (and/or an MDN within the authorization request message) may enhance the level of security of the authentication techniques described herein.

Figure 12:
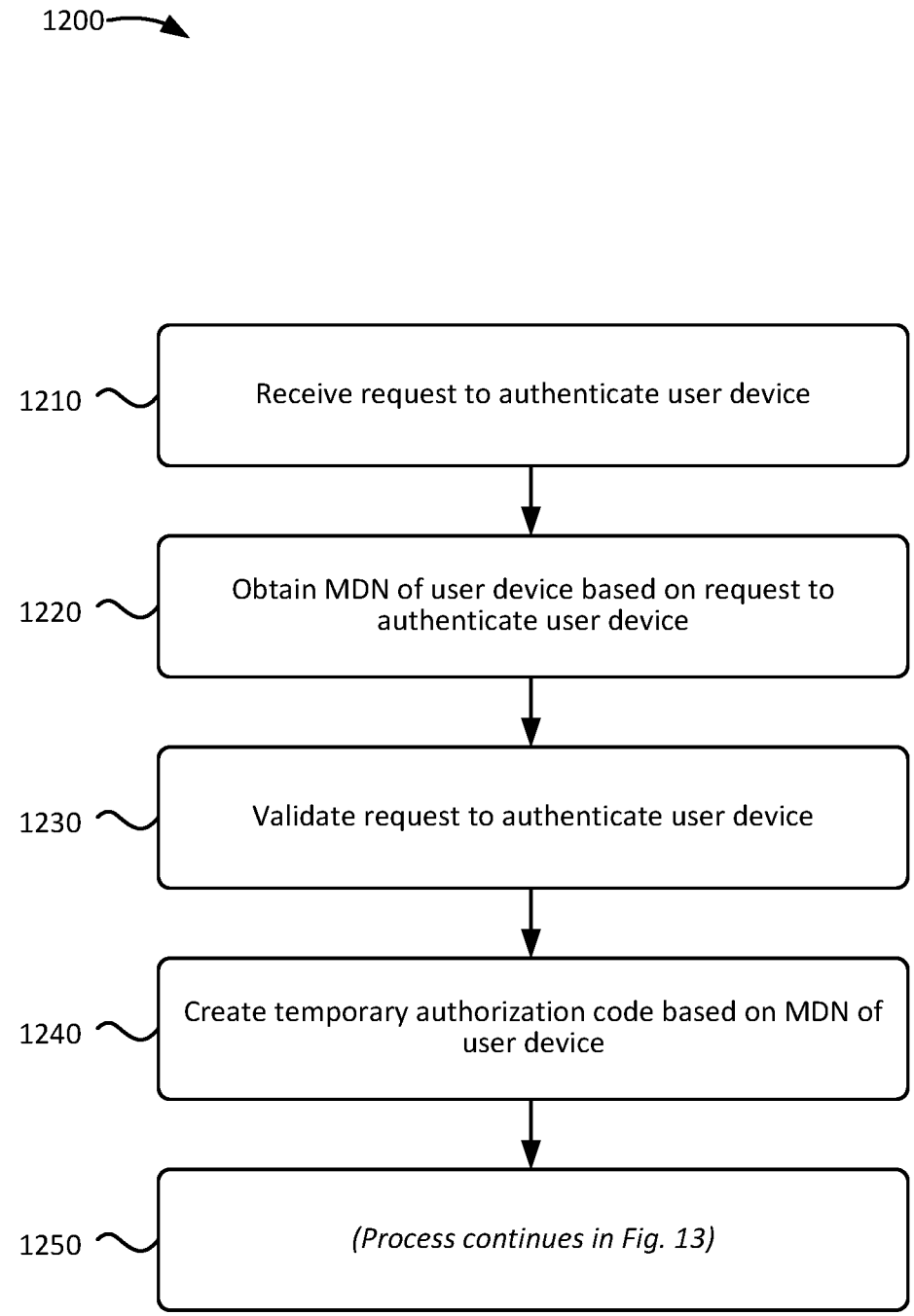
FIGS. 12 and 13 are flowchart diagrams of an example process for authenticating a user device based on a mobile device number (MDN) of user device.
Figure 13:
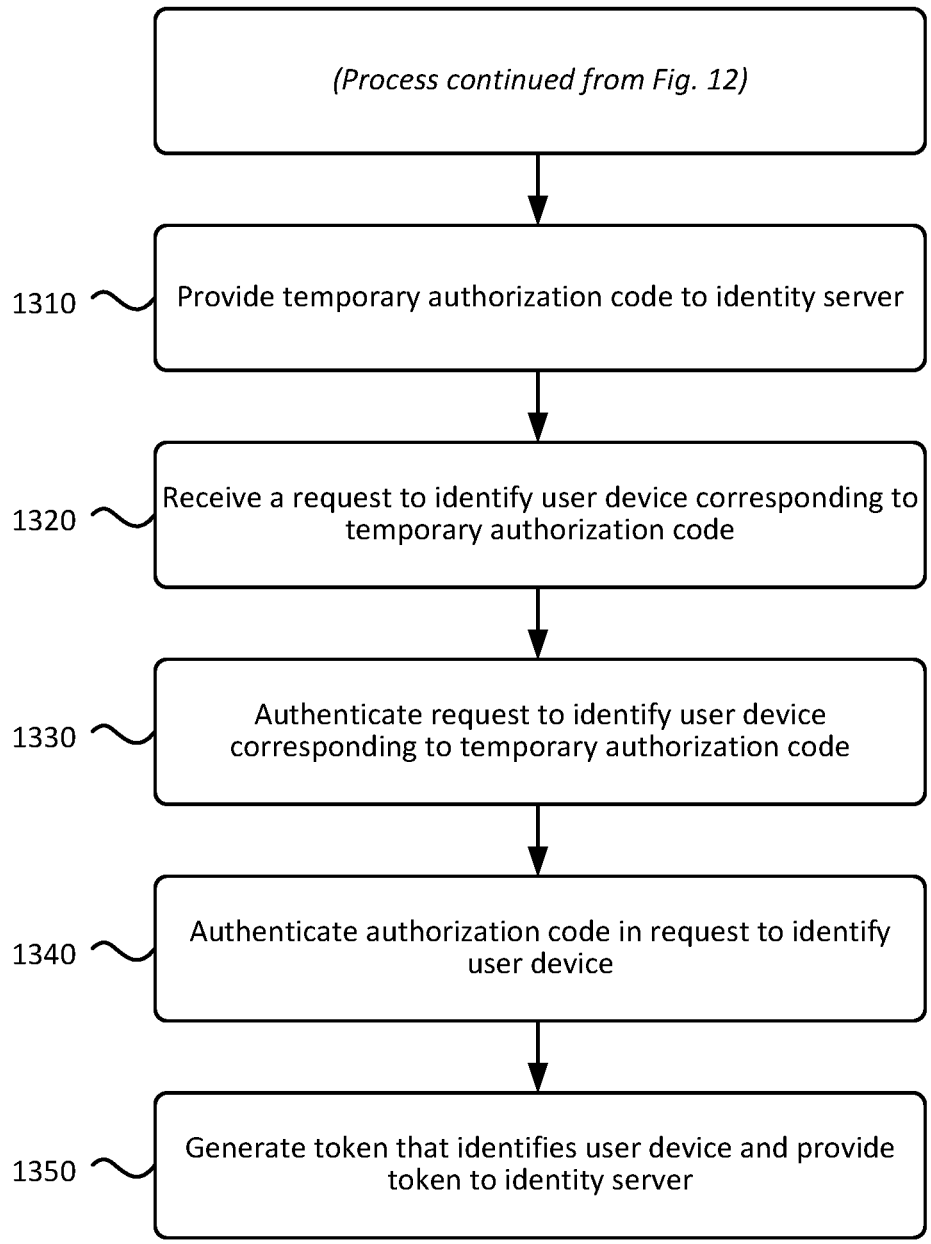

FIGS. 12 and 13 are flowchart diagrams of an example process 1200 for authenticating user device 1010 based on an MDN of user device 1010. In some implementations, process 1200 may be implemented by one or more of application server 1020, identity server 1030, and network authentication system 1040.

As shown, process 1200 may include receiving a request to authenticate user device 1010 (block 1210). For example, network authentication system 1040 may receive a request, from user device 1010, to authenticate user device 1010. The request may include identification information of identity server 1030. Examples of such information may include an identifier of identity server 1030 and a Callback Universal Resource Locator (URL) of identity server 1030. In some implementations, network authentication system 1040 may have been informed of the identifier of identity server 1030 on a previous occasion, such as upon identity server 1030 registering to use network authentication system 1040 to authenticate user devices 1010 (e.g., user devices 1010 associated with the same network service provider as network authentication system 1040.

Process 1200 may include obtaining an MDN of user device 1010 based on the request to authenticate user device 1010 (block 1220). For example, network authentication system 1040 may extract an IP address of user device 1010 from the request to authenticate user device 1010, and may determine the MDN of user device 1010 based on the IP address. For example, in some implementations, when user device 1010 attaches to network 1050, user device 1010 may receive an IP address for communicating with network 1050. A record of the IP address and the MDN of user device 1010 may be stored by network authentication system 1040 (e.g., MDN server 1110). As such, when user device 1010 uses the IP address to send a request for authentication to network authentication system 1040, the IP address may be used by network authentication system 1040 to determine the MDN of user device 1010.

In some implementations, network authentication system 1040 may determine that a failure event has occurred. For instance, network authentication system 1040 may determine that the IP address of the request does not match any of the IP addresses assigned to user devices 1010 by network 1050, that the port number associated with the request does not match a port number that was pre-selected for such requests, that there is no MDN associated with the IP address (and/or port number) of the request, etc. In such a scenario, network authentication system 1040 may provide identity server 1030 with an indication that user device 1010 is not authenticated, which may cause identity server 1030 to, for example, indicate to application server 1020 that user device 1010 has not been authenticated by network authentication system 1040, that user device 1010 poses a security threat to application server 1020, and/or execute another type appropriate response. In some implementations, application server 1020 may respond to a security threat (or potential security threat) from user device 1020 by initiating a two-factor authentication procedure, such as the two-factor authentication procedure described above with reference to FIGS. 1B and 5-8.

Process 1200 may include validating the request to authenticate user device 1010 (block 1230). For example, network authentication system 1040 may verify the authenticity of the request to authenticate user device 1010 by verifying that the request originated from a device permitted to have user devices 1010 authenticated by network authentication system 1040. For example, network authentication system 1040 may extract the identifier of identity server 1030 and/or a Callback URL included in the request (e.g., a URL of identity server 1030) and verify that the identifier and/or Callback URL corresponds to an identity server that is registered for having user devices 1010 authenticated by network authentication system 1040. For example, network authentication system 1040 may compare the ID and/or the URL to a previously stored ID and/or URL that corresponds to a known or trusted identity server.

Process 1200 may include creating a temporary authorization code based on the MDN of user device 1010 (block 1240). For example, network authentication system 1040 may generate a unique sequence of information based on the MDN of user device 1010. In some implementations, network authentication system 1040 may do so by applying a hash function to the MDN and/or one or other types of information that are pre-selected for providing the basis for temporary authorization codes. The temporary authorization code may indicate or represent that user device 1010 is registered with (or otherwise known to) a network of network authentication system 1040, and user device 1010 is currently undergoing an authorization procedure involving a legitimate identity server (e.g., an identity server that is registered to have user devices 1010 authenticated by network authentication system 1040). In some implementations, the temporary authorization code may indicate (or represent) that identity server 1030 may proceed with the authorization of user device 1010 by requesting the MDN of user device (which may be provided via a token that may include the MDN).

As shown, process 1200 may include operations involving redirect messages, temporary authorization codes, identity tokens, encryption practices, and/or other types of security-oriented features. In some implementations, the combination and implementation of some or all of these features may, for example, better ensure that security is maintained. For instance, if network authentication system 1040 were to immediately respond with the MDN of user device 1010 after validating the request to authenticate user device 1010 (e.g., block 1230), it may be possible for an unauthorized device with an ID of identity server 1030 and/or a suitable Callback URL obtain MDNs from network authentication system 1040. In some implementations, such a scenario may be avoided by, for example, implementing additional layers of security, such as responding to the request to authenticate user device 1010 by providing a temporary authorization code that does not include the MDN of user device 1010 but may be used to obtain the MDN of user device 1010 (e.g., by using the temporary authorization code to request an identity token that may include a copy of the MDN that must be decrypted).

As such, implementing some or all of the security-oriented features, described herein, may help enable identity server 1030 to ensure that network authentication system 1040 has, in fact, authenticated user device 1010 and/or that the MDN received by identity server 1030 did, in fact, come from network authentication system 1040. Similarly, implementing some or all of the security-oriented features, described herein, may help enable network authentication system 1040 to ensure that, for example, a request to authenticate user device 1010 actually originated from identity server 1030 and/or that an MDN being provided is being provided by network authentication system 1040 is actually being provided to identity server 1030. Additionally, or alternatively, implementing some or all of the security-oriented features, described herein, may enable identity server 1030, and/or network authentication system 1040, to better ensure that an unauthorized device is not operating as, or intercepting information sent between, identity server 1030 and network authentication system 1040.

Referring now to FIG. 13, process 1200 may include providing the temporary authorization code to identity server 1030 (block 1310). For example, network authentication system 1040 may send the temporary authorization code to identity server 1030. In some implementations, network authentication system 1040 may send the temporary authorization code directly to identity server 1030. In some implementations, network authentication system 1040 may send the temporary authorization code to identity server 1030 via user device 1010. For example, network authentication system 1040 may extract the Callback URL from the request to authenticate user device 1010 and may reply to the request with a redirect message (e.g., a 302 Redirect message) that is sent to user device 1010. The redirect message may include the Callback URL of identity server 1030 and the temporary authorization code.

Process 1200 may include receiving a request to identify the user device corresponding to the temporary authorization code (block 1320). For example, network authentication system 1040 may receive a request for a token (also referred to herein as an "identity token") for user device 1010. In some implementations, the request may be received directly from identity server 1030 (as opposed to, for example, via user device 1010). In some implementations, the request may include a copy of the temporary authorization code previously provided to identity server 1030, from network authentication system 1040, which may have been via user device 1010.

Process 1200 may include authenticating the request to identify the user device corresponding to the temporary authorization code (block 1330). For example, network authentication system 1040 may extract the identifier of identity server 1030 from the request, and may verify that the identity corresponds to a device that is authorized to have user devices 1010 authenticated by network authentication system 1040. If identity server 1030 is authorized to have the user device 1010 identified, network authentication system 1040 may authenticate the request. If identity server 1030 is not authorized to have the user device 1010 identified, network authentication system 1040 may reject the request to identify user device 1010.

Process 1200 may include authenticating the request to identify the user device corresponding to the temporary authorization code (block 1340). For example, network authentication system 1040 may compare the temporary authorization code from the request to a copy of the temporary code that was sent to identity server 1030 previously. If the two temporary authorization codes match, network authentication system 1040 may authenticate the temporary authorization code from the request. If the two temporary authorization codes do not match, network authentication system 1040 may reject the request to identify (e.g., obtain the MDN of) user device 1010.

Process 1200 may include generating a token that identifies user device 1010 and providing the token to identity server 1030 (block 1350). For example, network authentication system 1040 may identify the MDN of the user device that corresponds to the temporary authorization code. Additionally, network authentication system 1040 may create a token based on the MDN of user device 1010. In some implementation, network authentication system 1040 may create the token by applying a hash function to the MDN (and/or one or more other types of pre-selected information) and encrypting the result of the hash function.

Network authentication system 1040 may also, or alternatively, communicate the token to identity server 1030. In some implementations, network authentication system 1040 may include a digital signature upon which identity server 1030 may authenticate the token. In some implementations, the token may include a JavaScript Object Notation (JSON) Web Token (JWT), and the MDN may be inserted into the "subject" parameter of the JWT. Additionally, in some implementations, the token may include various types of information, such as an identity of the issuer of the token (e.g., an identifier of token server 1140), the MDN of user device 1010, an identifier of identity server 1030, a token identifier (e.g., a nonce), a timestamp, an expiration time, an authentication time, a type of authentication used, etc.

Figure 14:
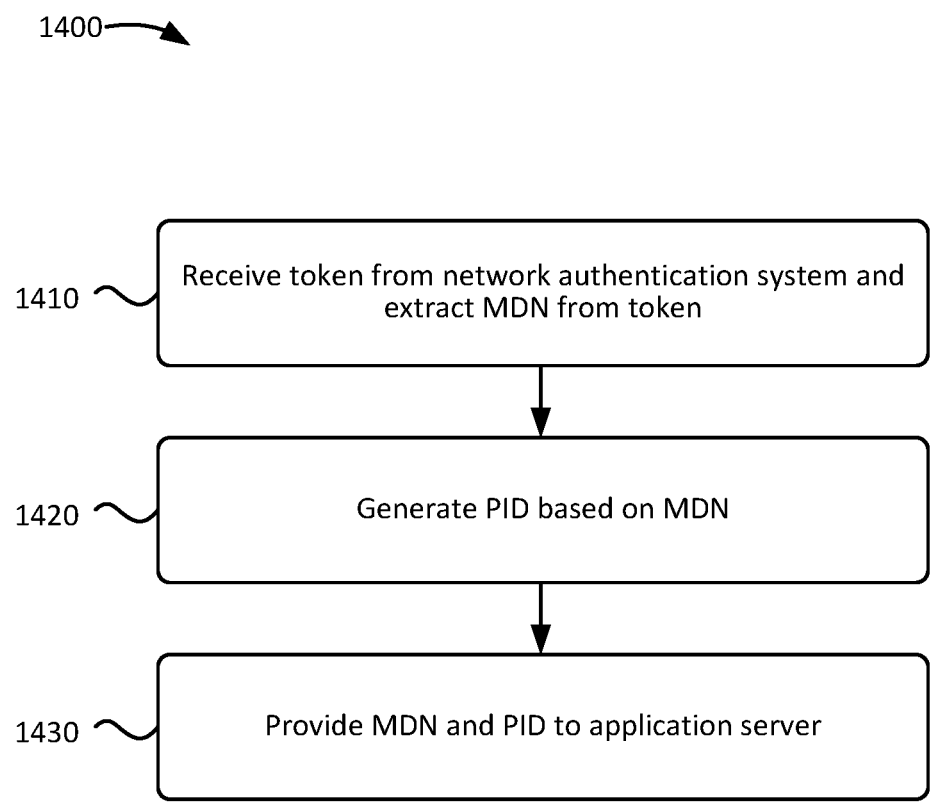
FIG. 14 is a flowchart diagram of an example process for authenticating a user device.

FIG. 14 is a flowchart diagram of an example process 1400 for authenticating user device 1010. In some implementations, process 1400 may be implemented by identity server 1030. In some implementations, process 1400 may be performed in response to process 1300 described above with reference to FIGS. 13 and 5. For example, process 1300 may end with an operation for generating a token that identifies user device 1010 and providing the token to identity server 1030, and process 1400 may begin with receiving the token from network authentication system 1040 and extracting an MDN, corresponding to user device 1010, from the token.

As shown, process 1400 may include receiving a token from network authentication system 1040 and extracting an MDN from the token (block 1410). In some implementations, the token may have been encrypted by network authentication system 1040, and identity server 1030 may decrypt the token in order to extract an MDN corresponding to user device 1010. As described above, the token may be the product of various operations whereby network authentication system 1040 authenticates user device 1010.

Process 1400 may include generating a PID based on the MDN (block 1420). For instance, identity server 1030 may process the MDN in one or more ways in order to produce a PID for user device 1010. In some implementations, identity server 1030 may produce the PID by applying a pre-selected hash function to the MDN. In some implementations, prior to applying the hash function, identity server 1030 may combine the MDN with one or more other types of information (such as a randomly generated sequence).

Process 1400 may also include providing the MDN and PID to application server 1020 (block 1430). For example, identity server 1030 may indicated application server 1020 that user device 1010 has been authenticated (by, for example, process 1300 of FIGS. 13 and 5) by sending the MDN and/or PID to application server 1020. In some implementations, doing so may cause application server 1020 to grant access to a network service requested by user device 1010. In some implementations, the MDN and/or the PID may be provided to application server 1020 based on an authentication request by application server 1020.

Additionally, or alternatively, doing so may cause application server 1020 to store a copy of the MDN and PID, and send the PID to user device 1010. In such implementations, this may enable user device 1010 to be subsequently authenticated based on the PID. For instance, on a subsequent occasion, user device 1010 may request access to the network service offered by application server 1020 and may provide the PID to application server 1020. In response to the request, application server 1020 may compare the PID received from user device 1010 with the copy of the PID previously stored for user device 1010. If the PIDs match, application server 1020 may grant user device 1010 access to the requested network service. However, if the PIDs do not match, application server 1020 may not grant user device 1010 access to the requested network service.

Figure 15:
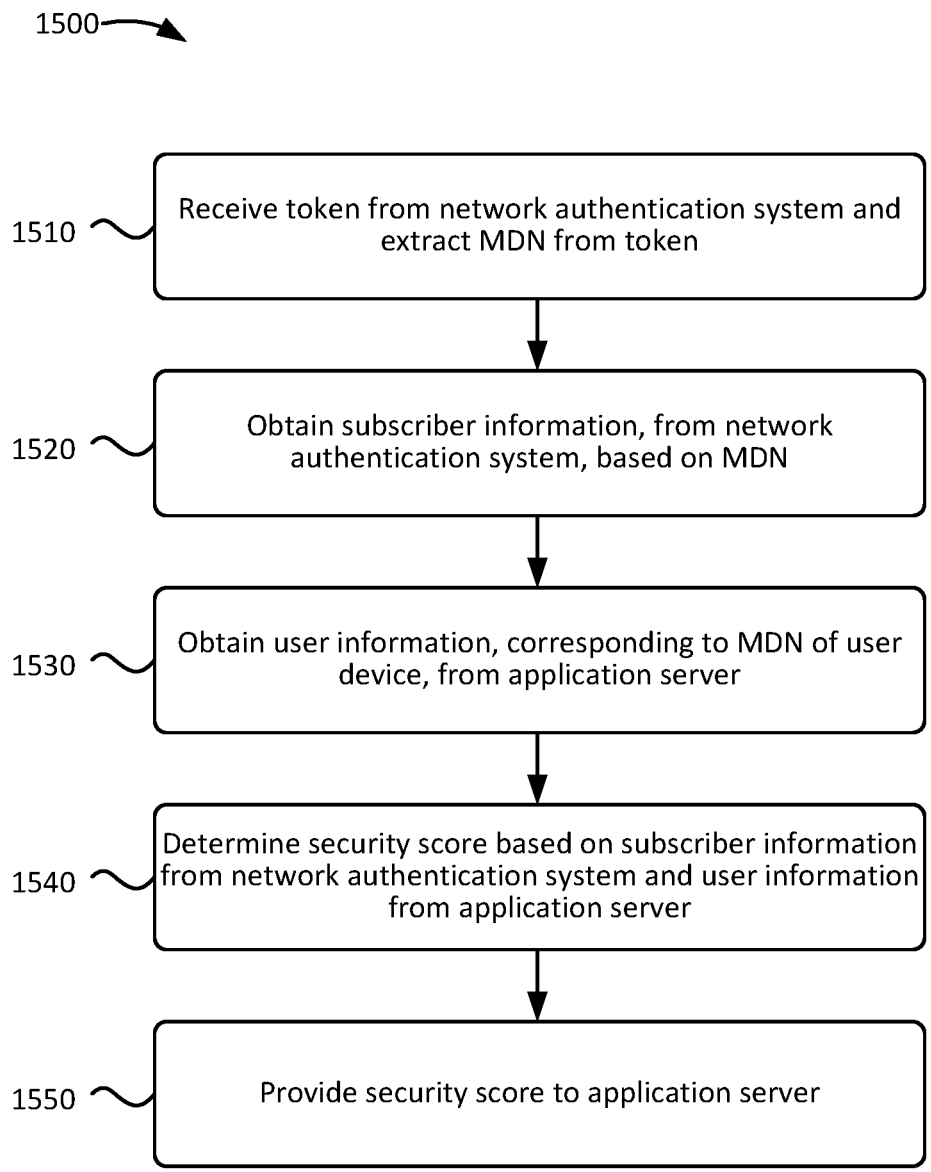
FIG. 15 is a flowchart diagram of an example process for determining whether a user device is a security risk.

FIG. 15 is a flowchart diagram of an example process 1500 for determining whether user device 1010 is a security risk. In some implementations, process 1500 may be implemented by identity server 1030. In some implementations, process 1500 may be performed in response to process 1300 described above with reference to FIGS. 13 and 5. For example, process 1300 may end with an operation for generating a token that identifies user device 1010 and providing the token to identity server 1030, and process 1500 may begin with receiving the token from network authentication system 1040 and extracting an MDN, corresponding to user device 1010, from the token.

As shown, process 1500 may include receiving a token from network authentication system 1040 and extracting an MDN from the token (block 1510). In some implementations, the token may have been encrypted by network authentication system 1040, and identity server 1030 may be required to decrypt the token in order to extract an MDN corresponding to user device 1010. As described above, the token may be the product of various operations whereby network authentication system 1040 may authenticate user device 1010. In some implementations, the token may include a digital signature corresponding to network authentication system 1040.

Process 1500 may also include obtaining subscriber information, from network authentication system 1040, based on the MDN (block 1520). For example, identity server 1030 may communicate a request to network authentication system 1040 for subscriber information corresponding to the MDN extracted from the token. As mentioned above, examples of subscriber information may include a first name, a last name, a street address, a billing address, an email address, payment information, etc. For example, in implementations where network authentication system 1040 is owned and operated by a network service provider, the subscriber information requested by identity server 1030 may include any type of subscriber information pertaining to user device 1010.

Process 1500 may also include obtaining user information, corresponding to the MDN, from application server 1020. For example, identity server 1030 may send a request to application server 1020 (or another server device owned and operated by the same organization) for user information pertaining to a user account that is managed and maintained by application server 1020. In some implementations, the user information requested (and/or obtained from) application server 1020 may be the same types of user information requested (and/or obtained from) network authentication system 1040. As such, examples of the user information obtained from application server 1020 may similarly include a first name, a last name, a street address, a billing address, an email address, payment information, etc.

Process 1500 may include determining a security score based on the subscriber information from network authentication system 1040 and application server 1020 (block 1540). For example, identity server 1030 may compare the subscriber information obtained from network authentication system 1040 with the user information obtained from application server 1020 to determine whether (or how much) the two sets of information are the same. When the two sets of information match, identity server 1030 may assign a relatively high security score (e.g., 100 out of 100 for a perfect match) to user device 1010, which may indicate that it is unlikely that user device 1010 is a security risk to application server 1020. By contrast, as the two sets of differ, identity server 1030 may assign a lower security score to user device 1010, which may indicate that user device 1010 is likely a security risk to application server 1020. As such, the security score determined by identity server 1030 may represent the degree to which the two sets of information match.

In some implementations, the degree of difference (or similarity) between the subscriber information and the user information may be based on a pre-selected scoring system. For example, if all of the subscriber information matches the user information, except for the first names, identity server 1030 may subtract a particular number or percentage (e.g., 20 points) of points from a perfect score (e.g., 100 points). In another example, each difference between the subscriber information and the user information may reduce the number of remaining points by a percentage (e.g., 20%). For instance, if all of the subscriber information matches the user information, except for the name and the street address, a perfect score of 100 points may be reduced by 20% (to 80) for the difference in name and then another 20% (to 64, since 80-(80×0.2)=64) for the difference in street address.

Since reducing a number (e.g., 100) by an incremental percentage (e.g., 20%) will mathematically never equal 0, a threshold number of points (e.g., 30 points) may be designated so that a score of 0 may be awarded if a score breaches the threshold. In yet another example, each type of information may be assigned a number of points (e.g., 5 points, 10 points, etc.) or a percentage that is intended to reflect the value of that type of information in identifying and/or authenticating a user or user device 1010. For example, the name of a user may be 20 points, an email address may be 10 points, a street address may be 5 points, etc., and each difference between the subscriber information and the user information may reduce a perfect score by the corresponding amount of points. In some implementations, the security score may be determined by starting from a base value representing no matches (e.g., 0) and increase the security score based on the matches between the subscriber information and the user information.

Process 1500 may include providing the security score to application server 1020 (block 1550). For example, identity server 1030 may send the security score assigned to user device 1010 to application server 1020. As mentioned above, the security score may represent the likelihood that user device 1010 poses a security risk to application server 1020 (e.g., the likelihood that the user of user device 1010 is not authorized to access the user account and/or network service being requested by user device 1010). Providing the security score to application server 1020 may enable application server to take appropriate action with respect to user device 1010, which may include granting user device 1010 access to the network service being requested, denying access to the network service being requested, notifying user device 1010 that additional information is required in order to confirm the identity of user device 1010, etc.

Figure 16:
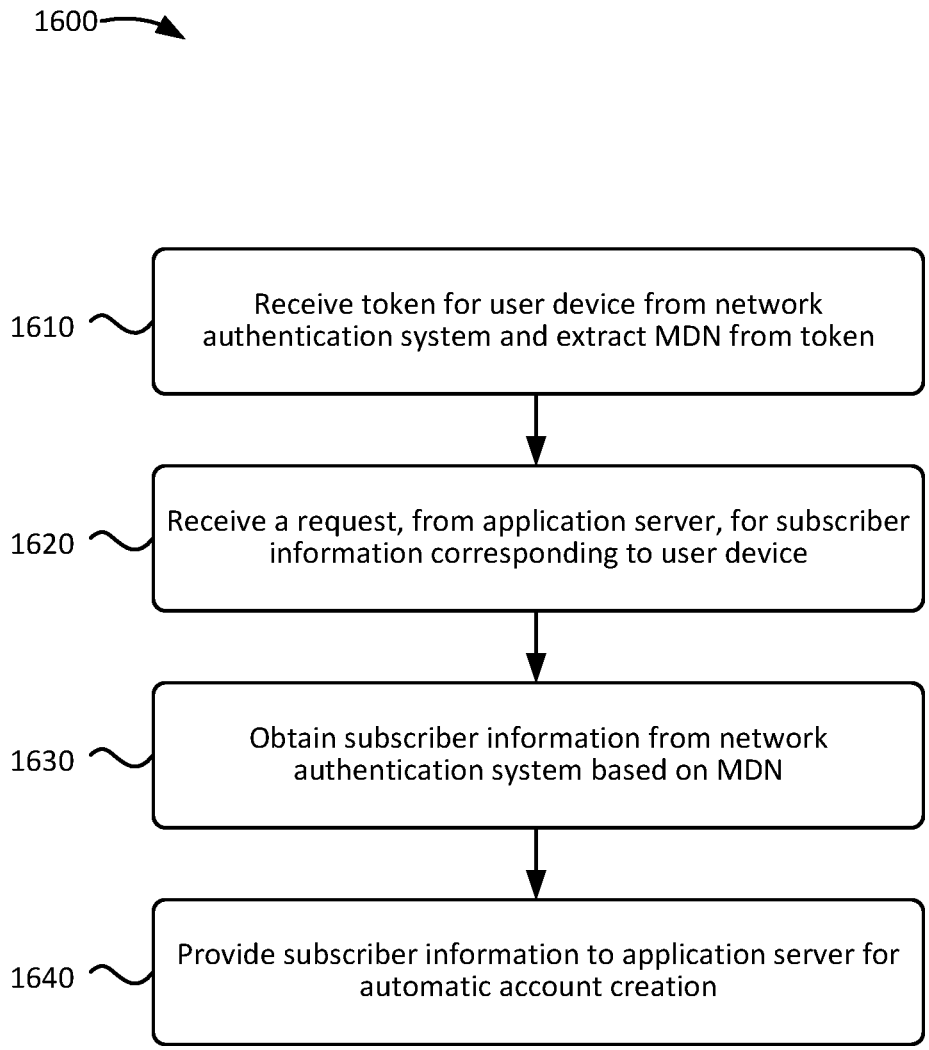
FIG. 16 is a flowchart diagram of an example process for providing an application server with user information for automatically creating a user account.

FIG. 16 is a flowchart diagram of an example process 1600 for providing application server 1020 with user information for automatically creating a user account. In some implementations, process 1600 may be implemented by identity server 1030. In some implementations, process 1600 may be performed in response to process 1300 described above with reference to FIGS. 13 and 5. For example, process 1300 may end with an operation for generating a token that identifies user device 1010 and providing the token to identity server 1030, and process 1600 may begin with receiving the token from network authentication system 1040 and extracting an MDN, corresponding to user device 1010, from the token.

As shown, process 1600 may include receiving a token from network authentication system 1040 and extracting an MDN from the token (block 1610). In some implementations, the token may have been encrypted by network authentication system 1040, and identity server 1030 may be required to decrypt the token in order to extract an MDN corresponding to user device 1010. As described above, the token may be the product of various operations whereby network authentication system 1040 authenticates user device 1010. In some implementations, the token may include a digital signature corresponding to network authentication system 1040.

Process 1600 may include receiving a request from application server 1020 for subscriber information corresponding to user device 1010 (block 1620). For example, application server 1020 may send a request to identity server 1030 for subscriber information corresponding to user device 1010 (and/or a user of user device 1010). As shown in FIG. 16, the request for subscriber information may be received at some point after identity server 1030 receives a token for user device 1010. In some implementations, the request for subscriber information may be received at some point before the token is received. For example, identity server 1030 may receive the request for the subscriber information before, or about the same time as, a request from application server 1020 to authenticate user device 1010.

Process 1600 may include obtaining subscriber information from network authentication system 1040 based on the MDN (block 1630). For example, identity server 1030 may communicate a request to network authentication system 1040 for subscriber information corresponding to the MDN extracted from the token. As mentioned above, examples of the subscriber information may include a first name, a last name, a street address, a billing address, an email address, payment information, etc. For example, in implementations, if network authentication system 1040 is owned and operated by a network service provider, the subscriber information requested by identity server 1030 may include any type of information pertaining to user device 1010 and stored by the network service provider systems and devices (e.g., subscriber information server 1150).

Process 1600 may include providing the subscriber information to application server 1020 for automatic account creation (block 1640). For example, in response to the request for subscriber information, identity server 1030 may send the subscriber information obtained, from network authentication system 1040, to application server 1020. Doing so may enable application server 1020 to, for example, automatically create a user account, corresponding to a network service offered by application server 1020, for the user of user device 1010. In another example, the subscriber information may enable application server 1020 to automatically fill out a form (such as a credit card application, a raffle ticket submission, etc.) and/or perform another type of automated service on behalf of the user of user device 1010.

Figure 17:
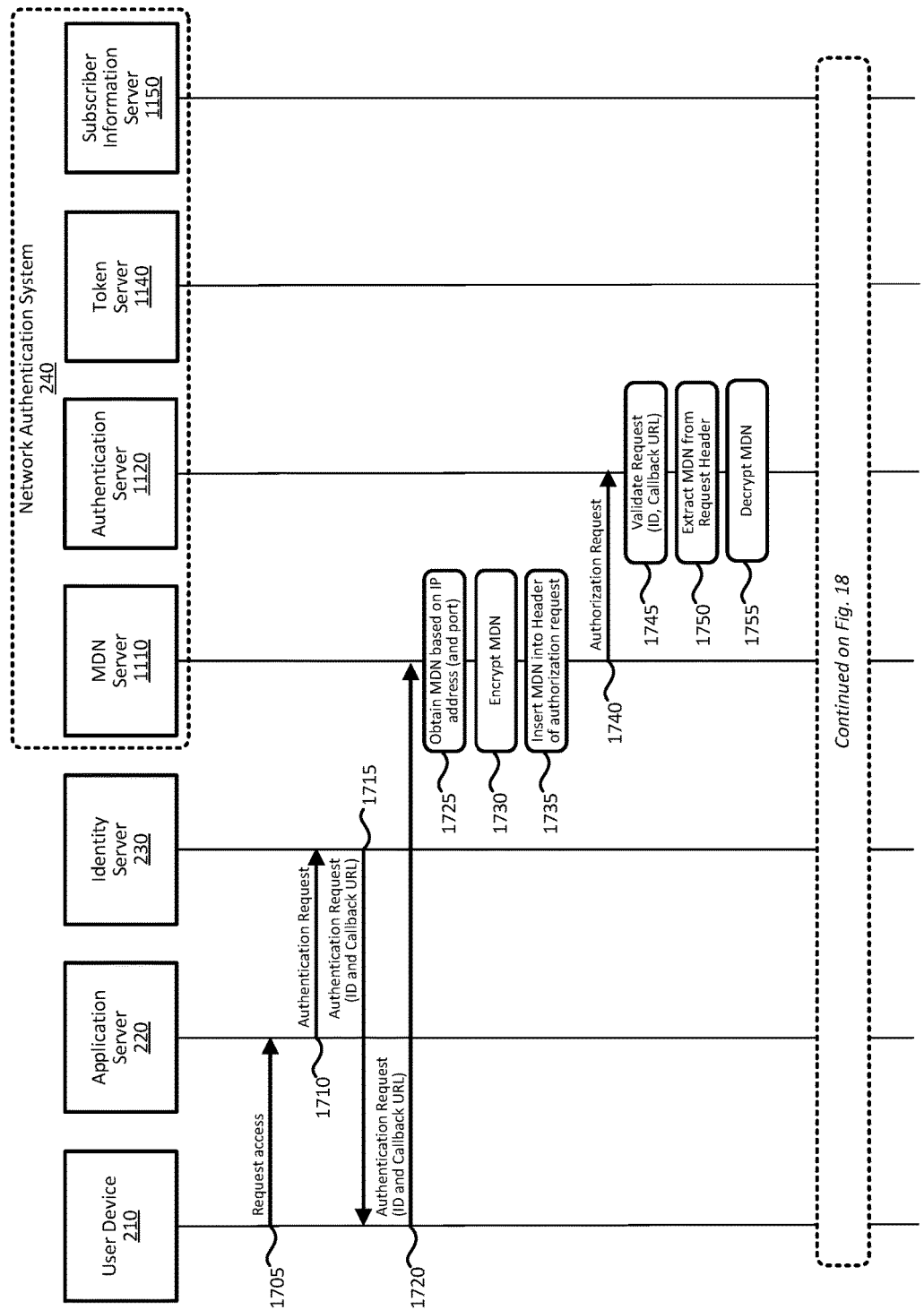
FIGS. 17-19 are sequence flow diagrams of an example of authenticating a user device and providing user information to application server.
Figure 18:
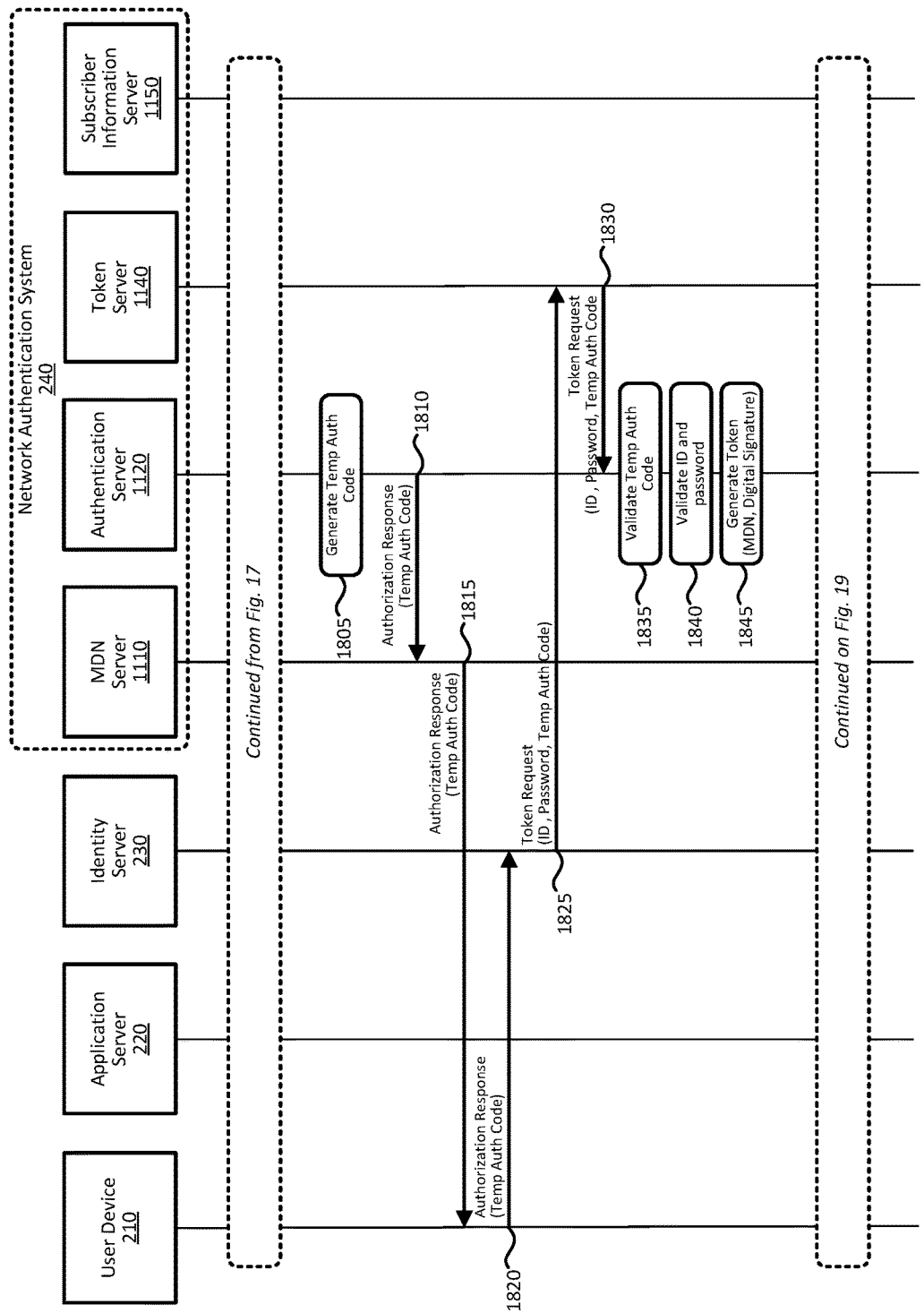
Figure 19:
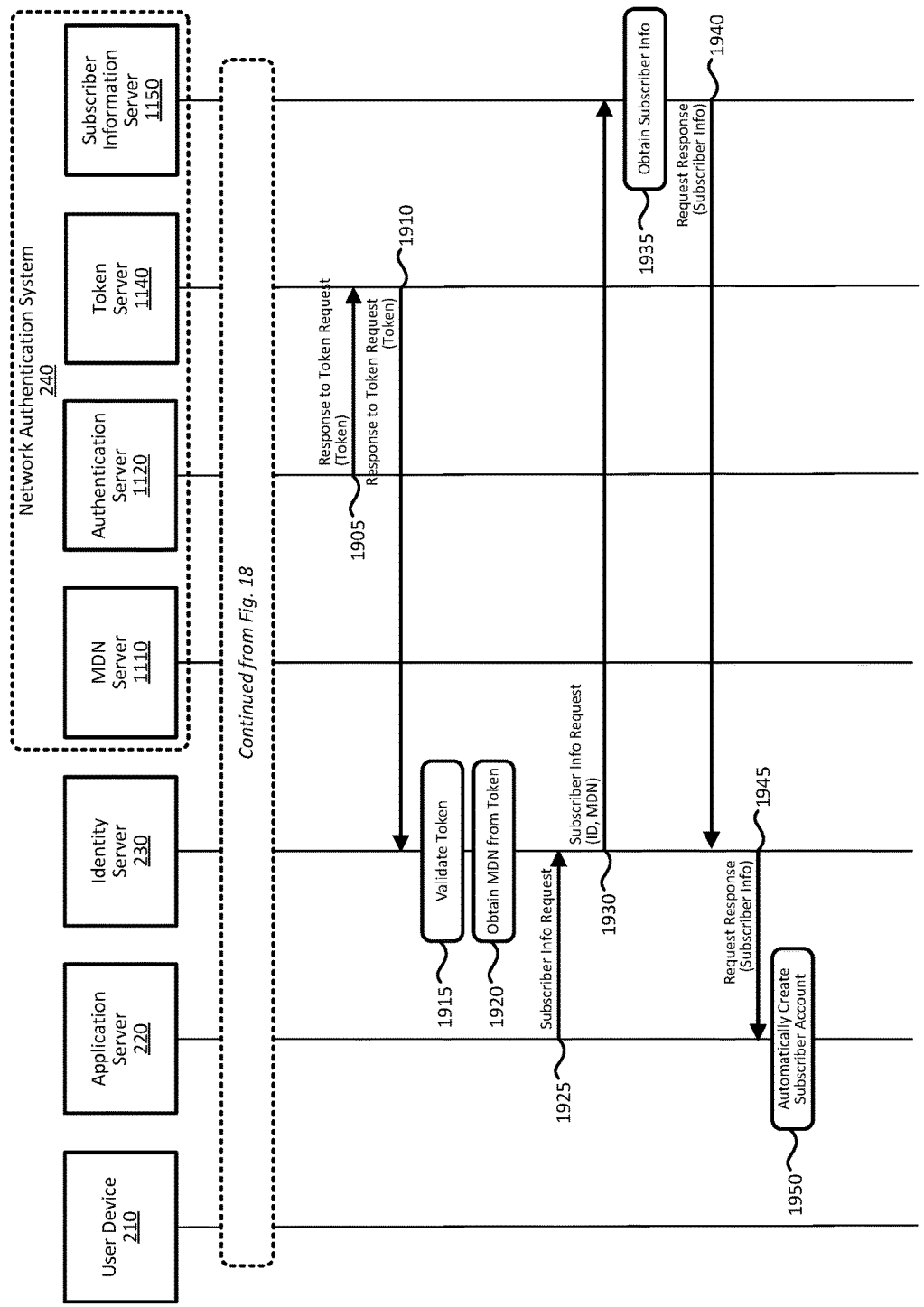

FIGS. 17-19 are sequence flow diagrams of an example of authenticating user device 1010 and providing subscriber information to application server 1020. The example of FIGS. 17-19 may include user device 1010, application server 1020, identity server 1030, and network authentication system 1040. Examples of these systems and devices are discussed above with reference to FIG. 10. Additionally, network authentication system 1040 may include MDN server 1110, authentication server 1120, token server 1140, and subscriber information server 1140. Examples of these devices are discussed above, with reference to FIG. 11.

As shown in FIG. 17, user device 1010 may send a request to application server 1020 for access to a particular network service (line 1705). The request may include, for example, a username and a password that user device 1010 provides via a webpage hosted by application server 1020. In response to the request, application server 1020 may send a request to identity server 1030 to authenticate user device 1010 (line 1710), and identity server 1030 may respond by sending an authentication request to user device 1010 (line 1715). As shown, the authentication request may include an identity of identity server 1030 and/or a Callback URL of identity server 1030. In some implementations, the authentication request may include a redirect message (e.g., a 302 Redirect message).

In some implementations, instead of sending the authentication request to identity server 1030 and having identity server 1030 redirect user device 1010 toward network authentication system 1040, application server 1020 may instead redirect (e.g., via a 302 Redirect message) user device 1010 directly to network authentication system 1040. In such implementations, application server 1020 may provide the ID and Callback URL for identity server 1030 so that the temporary authorization code that is subsequently produced (e.g., block 1005 of FIG. 10) is sent to identity server 1030 (as shown in, for example, FIG. 10). In some implementations, the request from identity server 1030 may be a redirect message to cause user device 1010 to forward the authentication request to MDN server 1110 (line 1720).

MDN server 1110 may respond to the authentication request by obtaining the MDN for the user device 1010 (block 1725). As described above, MDN server 1110 may obtain the MDN by identifying the IP address (and/or port number) used by user device 1010 to send the authentication request and by querying a data repository (e.g., data repository 1170) that may store records of the IP addresses, port numbers, and MDNs assigned to each user device 1010 that accesses a service provider's network. Additionally, MDN server 1110 may encrypt the MDN (block 1730). In some implementations, MDN server 1110 may encrypt the MDN using an encryption key that is stored locally by MDN server 1110.

In some implementations, MDN server 1110 may encrypt the MDN using an encryption key (e.g., a shared encryption key) obtained from another device, such as encryption key server 1130. MDN server 1110 may also create an authorization request message and insert the encrypted MDN into the header of the authorization request (block 1735), and may send the authorization request message to authorization server 1120 (block 1740). In some implementations, the authorization request message may include the ID of identity server 1030, the Callback URL, and the encrypted MDN of user device 1010.

Upon receiving the request, authorization server 1120 may validate the authorization request based on the ID and the Callback URL of identity server 1030 (block 1745). For example, authorization server 1120 may have access to IDs and/or Callback URLs of identity servers that are registered for authentication services provided by network authorization system 1040, and authorization server 1120 may validate authorization requests by verifying that the IDs and/or Callback URLs of authorization request messages correspond to a registered identity server. Authorization server 1120 may also extract the encrypted MDN from the header of the authorization request message (block 1750), and may decrypt the MDN (block 1755). In some implementations, authorization server 1120 may decrypt the MDN using an encryption key that is stored locally by authorization server 1120. In some implementations, authorization server 1120 may decrypt the MDN using an encryption key obtained from another device, such as encryption key server 1130. In some implementations, encrypting the MDN (by MDN server 1110) and then decrypting the MDN (by authentication server 1030) may help ensure that the MDN remains secure while the MDN is transmitted from one network device to another (which may involve long distances and/or multiple, intermediary network devices).

Referring now to FIG. 18, at some point after validating the authorization request and decrypting the MDN, authentication server 1120 may generate a temporary authorization code corresponding to user device 1010 (block 1805). In some implementations, the temporary authorization code may be a unique sequence of values that may be used for authentication purposes. For example, as discussed below, the temporary authorization code may be used to authenticate a request, from identity server 1030, for a token corresponding to user device 1010. In some implementations, the temporary authorization code may include, or be associated with, expiration information indicating a point in time after which the temporary authorization code will no longer be usable for authentication purposes.

Authentication server 1120 may send the temporary authorization code to MDN server 1110 (line 1810) in an authorization response message, MDN server 1110 may forward the authorization response message to user device 1010 (line 1815), and user device 1010 may forward the authorization response message to identity server 1030 (block 1820). In some implementations, the authorization response message may include a 302 HTTPS GET message with the Callback URL of identity server 1030. In response to the authorization response message, identity server 1030 may send a request, to token server 1140 (line 1825), which may include an HTTPS GET message. The token request may include credentials of identity server 1030 (e.g., an ID and password of identity server 1030 associated with identity server 1030 being registered with network authentication system 1040) and the temporary authorization code.

Token server 1140 may forward the token request to authentication server 1120 (line 1830), and authentication server 1120 may validate the temporary authorization code (block 1835). In some implementations, authentication server 1120 may validate the temporary authorization code by comparing the temporary authorization code of the token request with the temporary authorization code generated previously. Authentication server 1120 may also validate the credentials of identity server 1030 (e.g., the ID and password of identity server 1030) (block 1840). If the authorization code and the credentials are valid, authentication server 1120 may generate a token for user device 1010 (block 1845). If, however, the authorization code and/or the credentials are not valid, authentication server 1120 may not generate the token. As described above, the token may include an encrypted copy of the MDN of user device 1010 and/or one or more other types of pre-selected information, such as a digital signature of network authentication system 1040.

Referring now to FIG. 19, authentication server 1120 may provide the token to token server 1140 (line 1905), and token server 1140 may send the token to identity server 1030 (line 1910). In response to receiving the token, identity server 1030 may validate the token (block 1915). In some implementations, identity server 1030 may validate the token by decrypting the token and/or ensuring that the token includes certain types of information, such as a digital signature of network authentication system 1040. Identity server 1030 may also, or alternatively, obtain the MDN from the token (block 1920). In some implementations, the token may also, or alternatively, indicate to identity server 1030 that user device 1010 has been authenticated by network authentication system 1040. In some implementations, identity server 1030 may generate a PID (based on the MDN) and provide the PID and the MDN to application server 1020 as an indication that user device 1010 has been authenticated.

At some point, identity server 1030 may receive a request for subscriber information from application server 1020 (line 1925). As shown in FIG. 19, in some implementations, the request for subscriber information may be sent after identify server 1030 has obtained the MDN of user device 1010 from the token generated by network authentication system 1040. In some implementations, the request for subscriber information may be received at some other point, such as before (or at the same time as) the request to authenticate user device 1010.

In some implementations, the request may specify the types of subscriber information requested by application server 1020. Identity server 1030 may send a subscriber information request to subscriber information server 1150 (line 1930). The subscriber information request may include an ID of identity server 1030 and the MDN of user device 1010. Subscriber information server 1150 may obtain subscriber information corresponding to the MDN (block 1935), and may send the subscriber information to identity server 1030 (line 1940).

In some implementations, the ID provided to in the request for subscriber information may be an identity of application server 1020 (instead of, or in addition to, the identity of identity server 1030). In such implementations, the type of subscriber information obtained by subscriber information server 1150 may be based on the ID of application server 1020 since different types of application servers 1020 may be registered (and/or authorized) for accessing different types of subscriber information (e.g., in order to automatically create subscriber accounts). Identity server 1030 may forward the subscriber information to application server 1020 (line 1945). As shown, application server 1020 may use the subscriber information to automatically generate a subscriber account for a particular network service (block 1950). As mentioned above, examples of such services may include automatically generating a credit card application, a raffle ticket submission, or another digital form, on behalf of the user of user device 1010.

Figure 20:
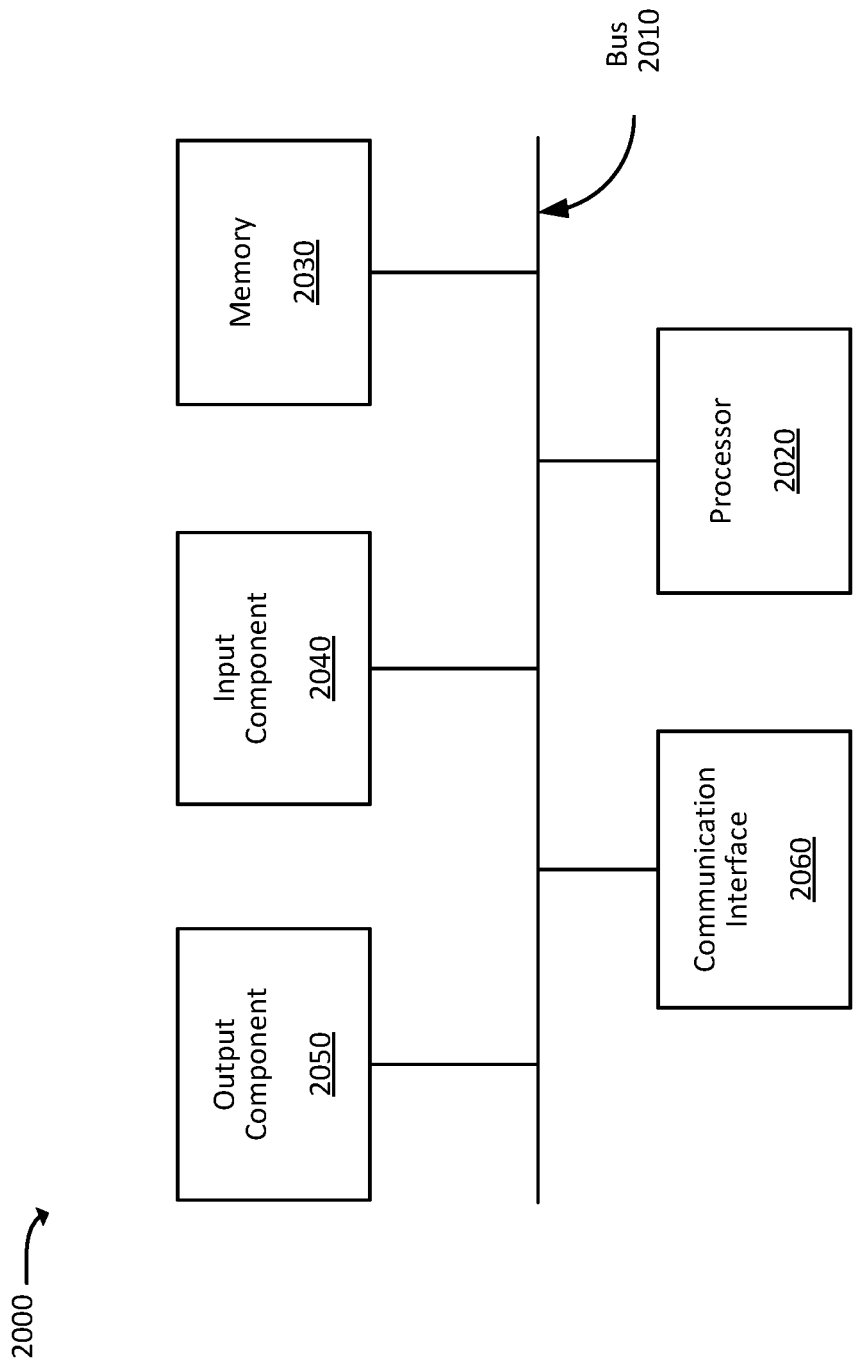
FIG. 20 is a diagram of example components of a device.

FIG. 20 is a diagram of example components of a device 2000. Each of the devices illustrated in FIGS. 1A-2, 4-7, 9A-11, and 17-19 may include one or more devices 2000. Device 2000 may include bus 2010, processor 2020, memory 2030, input component 2040, output component 2050, and communication interface 2060. In another implementation, device 2000 may include additional, fewer, different, or differently arranged components. As described herein, a component may be implemented by hardware circuitry, software logic, and/or some combination thereof.

Bus 2010 may include one or more communication paths that permit communication among the components of device 2000. Processor 2020 may include a processor, microprocessor, or processing logic that may interpret and execute instructions. Memory 2030 may include any type of dynamic storage device that may store information and instructions for execution by processor 2020, and/or any type of non-volatile storage device that may store information for use by processor 2020.

Input component 2040 may include a mechanism that permits an operator to input information to device 2000, such as a keyboard, a keypad, a button, a switch, etc. Output component 2050 may include a mechanism that outputs information to the operator, such as a display, a speaker, one or more light emitting diodes (LEDs), etc.

Communication interface 2060 may include any transceiver-like mechanism that enables device 2000 to communicate with other devices and/or systems. For example, communication interface 2060 may include an Ethernet interface, an optical interface, a coaxial interface, or the like. Communication interface 2060 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 2000 may include more than one communication interface 2060. For instance, device 2000 may include an optical interface and an Ethernet interface.

Device 2000 may perform certain operations described above. Device 2000 may perform these operations in response to processor 2020 executing software instructions stored in a computer-readable medium, such as memory 2030. A computer-readable medium may be defined as a non-transitory memory device. A memory device may include space within a single physical memory device or spread across multiple physical memory devices. The software instructions may be read into memory 2030 from another computer-readable medium or from another device. The software instructions stored in memory 2030 may cause processor 2020 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1A, 1B, 3-9C, and 12-19 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
receiving, by one or more devices of a telecommunications network, an authentication request, from a user device registered to access the telecommunications network, to authenticate the user device, the authentication request including a callback universal resource locator (URL) of an identity server;
identifying, by the one or more devices, an Internet Protocol (IP) address used by the user device to send the authentication request;
authenticating, by the one or more devices, the user device by determining that the telecommunications network has previously associated the IP address with a mobile device number (MDN) of the user device;
generating, by the one or more devices, a temporary authorization code based on the MDN;
creating, by the one or more devices, a redirect message that includes the callback URL of the identity server and the temporary authorization code;
sending, by the one or more devices, the temporary authorization code, to the identity server, by sending the redirect message to the user device, wherein receipt of the redirect message, by the user device, causes the user device to use the callback URL to send the temporary authorization code to the identity server;
receiving, by the one or more devices and from the identity server, a request for a token corresponding to the user device, the request for the token including authentication credentials of the identity server and the temporary authorization code;
validating, by the one or more devices, the request for the token by:
validating the authentication credentials of the identity server, and
determining that the temporary authorization code, included in the request for the token, matches the temporary authorization code previously sent to the identity server;
identifying, by the one or more devices and after validating the request for the token, the MDN of the user device based on the temporary authentication code included in the request for the token;
creating, by the one or more devices and after validating the request for the token, the token requested by the identity server, the token being based on the MDN of the user device;
enabling, by the one or more devices, the identity server to authenticate the user device by sending the token to the identity server;
receiving, by the one or more devices, a request from the identity server for subscriber information corresponding to the user device, the request for subscriber information including an identifier of an application server and the MDN;
identifying, by the one or more devices and based on the identifier of the application server, types of subscriber information that identity server is registered to receive;
identifying, by the one or more devices and based on the MDN and the types of subscriber information that the application server is authorized to receive, first subscriber information that the application server should receive; and
sending, by the one or more devices and to the identity server, the first subscriber information to enable the identity server to determine whether the user device is a security threat to the application server, wherein to determine whether the user device is the security threat to the application server, the identity server:
obtains second subscriber information from the application server;
compares the first subscriber information to the second subscriber information;
determines a security score, based on the comparison of the first subscriber information to the second subscriber information, the security score representing a likelihood of the user device being the security threat to the application server; and
sends the security score to the application server.

2. The method of claim 1, wherein the token includes a digital signature of the one or more devices, the digital signature enabling the identity server to verify that the token was created by the one or more devices.

3. The method of claim 1, wherein:
the one or more devices include a plurality of network servers of the telecommunications network, and
the determining that the telecommunications network has previously associated the IP address with the MDN of the user device includes:
sending, by a first network server, of the plurality of network servers, the IP address of the user device to a second network server, of the plurality of network servers, along with a request for the MDN associated with the IP address, and
receiving, by the first network server and from a third server of the plurality of network servers, the MDN of the user device.

4. The method of claim 1, wherein:
the one or more device include a plurality of network servers of the telecommunications network, and
the method further comprises:
obtaining, by a first network server of the plurality of network servers, an encryption key, from a second network server of the plurality of network servers, that is pre-selected for in-network communications;
encrypting, by the first network server, the MDN with the encryption key;
creating, by the first network server, an authorization request message that includes an identifier and the callback URL of the identity server;
inserting the encrypted MDN into a header of the authorization request message; and
sending, by the first network server, the authorization request message to a third network server of the plurality of network servers for validation.

5. The method of claim 4, further comprising:
receiving, by the third network server, the authorization request message;
extracting, by the third network server, from the authorization request message, the identifier and the callback URL of the identity server;
validating, by the third network server, the authorization request message based on the identifier and the callback URL of the identity server;
extracting, by the third network server, the encrypted MDN from the header of the authorization request message;
obtaining, by the third network server, a copy of the encryption key from the second network server;
decrypting, by the third network server, the encrypted MDN to determine the MDN;
generating, by the third network server, a second temporary authorization code based on the MDN that was determined based on the decrypting;

creating, by the third network server, a second redirect message that includes the callback URL of the identity server and the temporary authorization code; and sending, by the third network server, the second temporary authorization code, to the identity server, by sending the second redirect message to the user device.

6. The method of claim 1, wherein:

a first network server includes a regional server device that corresponds to a particular portion of the telecommunications network, a second network server includes a centralized server device that manages and distributes encryption keys for server devices throughout the telecommunications network, and a third network server includes another centralized server device that provides validation and authentication services to the server devices throughout the telecommunications network.

7. The method of claim 1, further comprising:

sending, to the application server, via the identity server, the first subscriber information to the application server.

8. The method of claim 1, further comprising:

automatically creating, by the application server, a service account, for a user of the user device, based on the subscriber information.

9. One or more devices, comprising:

a non-transitory memory device storing a plurality of processor-executable instructions; and a processor configured to execute the processor-executable instructions, wherein executing the processor-executable instructions cause the processor to:

receive an authentication request, from a user device registered to access a telecommunications, to authenticate the user device, the authentication request including a callback universal resource locator (URL) of an identity server;

identity an Internet Protocol (IP) address used by the user device to send the authentication request;

authenticate the user device by determining that the telecommunications network has previously associated the IP address with a mobile device number (MDN) of the user device;

generate a temporary authorization code based on the MDN;

create a redirect message that includes the callback URL of the identity server and the temporary authorization code;

send the temporary authorization code, to the identity server, by sending the redirect message to the user device, wherein receipt of the redirect message, by the user device, causes the user device to use the callback URL to send the temporary authorization code to the identity server;

receive, from the identity server, a request for a token corresponding to the user device, the request for the token including authentication credentials of the identity server and the temporary authorization code;

validate the request for the token by:

validating the authentication credentials of the identity server, and determining that the temporary authorization code, included in the request for the token, matches the temporary authorization code previously sent to the identity server;

identify, after validating the request for the token, the MDN of the user device based on the temporary authentication code included in the request for the token;

create, after validating the request for the token, the token requested by the identity server, the token being based on the MDN of the user device;

enable the identity server to authenticate the user device by sending the token to the identity server;

receive a request from the identity server for subscriber information corresponding to the user device, the request for subscriber information including an identifier of an application server and the MDN;

identify, based on the identifier of the application server, types of subscriber information that identity server is registered to receive;

identify, based on the MDN and the types of subscriber information that the application server is authorized to receive, first subscriber information that the application server should receive; and send, to the identity server, the first subscriber information to enable the identity server to determine whether the user device is a security threat to the application server, wherein to determine whether the user device is the security threat to the application server, the identity server:

obtains second subscriber information from the application server;

compares the first subscriber information to the second subscriber information;

determines a security score, based on the comparison of the first subscriber information to the second subscriber information, the security score representing a likelihood of the user device being the security threat to the application server; and sends the security score to the application server.

10. The one or more devices of claim 9, wherein the token includes a digital signature of the one or more devices to enable the identity server to verify that the token was created by the one or more devices.

11. The one or more devices of claim 9, wherein:

the one or more devices include a plurality of network servers of the telecommunications network, and to determine that the telecommunications network has previously associated the IP address with the MDN of the user device, the processor-executable instructions cause the processor to:

send, by a first network server of the plurality of network servers, the IP address of the user device to a second network server, of the plurality of network servers, along with a request for the MDN associated with the IP address, and receive, by the first network server and from a third server of the plurality of network servers, the MDN of the user device.

12. The one or more devices of claim 9, wherein:

the one or more device include a plurality of network servers of the telecommunications network, and the processor-executable instructions cause the processor to:

obtain, by a first network server of the plurality of network servers, an encryption key, from a second network server of the plurality of network servers, that is pre-selected for in-network communications;

encrypt, by the first network server, the MDN with the encryption key;

create, by the first network server, an authorization request message that include an identifier and the callback URL of the identity server;
insert the encrypted MDN into a header of the authorization request message; and
send, by the first network server, the authorization request message to a third network server of the plurality of network servers for validation.

13. The one or more devices of claim 12, wherein the processor-executable instructions cause the processor to:
receive, by the third network server, the authorization request message;
extract, by the third network server, from the authorization request message, the identifier and the callback URL of the identity server;
validate, by the third network server, the authorization request message based on the identifier and the callback URL of the identity server;
extract, by the third network server, the encrypted MDN from the header of the authorization request message;
obtain, by the third network server, a copy of the encryption key from the second network server;
decrypt, by the third network server, the encrypted MDN to determine the MDN;
generate, by the third network server, a second temporary authorization code based on the MDN that was determined based on the decrypting;
create, by the third network server, a second redirect message that includes the callback URL of the identity server and the temporary authorization code; and
send, by the third network server, the second temporary authorization code, to the identity server, by sending the second redirect message to the user device.

14. A non-transitory computer-readable medium storing a set of processor-executable instructions, wherein execution of the processor-executable instructions causes one or more processors to:
receive an authentication request, from a user device registered to access a telecommunications network, to authenticate the user device, the authentication request including a callback universal resource locator (URL) of an identity server;
identity an Internet Protocol (IP) address used by the user device to send the authentication request;
authenticate the user device by determining that the telecommunications network has previously associated the IP address with a mobile device number (MDN) of the user device;
generate a temporary authorization code based on the MDN;
create a redirect message that includes the callback URL of the identity server and the temporary authorization code;
send the temporary authorization code, to the identity server, by sending the redirect message to the user device, wherein receipt of the redirect message, by the user device, causes the user device to use the callback URL to send the temporary authorization code to the identity server;
receive, from the identity server, a request for a token corresponding to the user device, the request for the token including authentication credentials of the identity server and the temporary authorization code;
validate the request for the token by:
validating based on the authentication credentials of the identity server, and
determining that the temporary authorization code, included in the request for the token, matches the temporary authorization code previously sent to the identity server;
identify, after validating the request for the token, the MDN of the user device based on the temporary authentication code included in the request for the token;
create, after validating the request for the token, the token requested by the identity server, the token including the MDN of the user device;
enable the identity server to authenticate the user device by sending the token to the identity server;
receive a request from the identity server for subscriber information corresponding to the user device, the request for subscriber information including an identifier of an application server and the MDN;
identify, based on the identifier of the application server, types of subscriber information that identity server is registered to receive;
identify, based on the MDN and the types of subscriber information that the application server is authorized to receive, first subscriber information that the application server should receive; and
send, to the identity server, the first subscriber information to enable the identity server to determine whether the user device is a security threat to the application server, wherein, to determine whether the user device is the security threat to the application server, the identity server:
obtains second subscriber information from the application server;
compares the first subscriber information to the second subscriber information;
determines a security score, based on the comparison of the first subscriber information to the second subscriber information, the security score representing a likelihood of the user device being a security threat to the application server; and
sends the security score to the application server.

15. The non-transitory computer-readable medium of claim 14, wherein the token includes a digital signature, of one or more devices of the service provider network, to enable the identity server to verify that the token was created by the one or more devices.

16. The non-transitory computer-readable medium of claim 14, wherein execution of the processor-executable instructions further causes the one or more processors to:
send, to the application server, via the identity server, the first subscriber information to the application server.

17. The non-transitory computer-readable medium of claim 14, wherein the processor-executable instructions, to determine that the telecommunications network has previously associated the IP address with the MDN of the user device, further include processor-executable instructions to:
send, by a first network server of a plurality of network servers associated with the telecommunications network, the IP address of the user device to a second network server, of the plurality of network servers, along with a request for the MDN associated with the IP address, and
receive, by the first network server and from a third server of the plurality of network servers, the MDN of the user device.

18. The non-transitory computer-readable medium of claim 14, wherein execution of the processor-executable instructions further causes the one or more processors to:

obtain, by a first network server of plurality of network servers associated with the telecommunications network, an encryption key, from a second network server of the plurality of network servers, that is pre-selected for in-network communications;

encrypt, by the first network server, the MDN with the encryption key;

create, by the first network server, an authorization request message that includes an identifier and the callback URL of the identity server;

insert the encrypted MDN into a header of the authorization request message; and send, by the first network server, the authorization request message to a third network server of the plurality of network servers for validation.

19. The non-transitory computer-readable medium of claim 18, wherein execution of the processor-executable instructions further causes the one or more processors to:

receive, by the third network server, the authorization request message;

extract, by the third network server, from the authorization request message, the identifier and the callback URL of the identity server;

validate, by the third network server, the authorization request message based on the identifier and the callback URL of the identity server;

extract, by the third network server, the encrypted MDN from the header of the authorization request message;

obtain, by the third network server, a copy of the encryption key from the second network server;

decrypt, by the third network server, the encrypted MDN to determine the MDN;

generate, by the third network server, a second temporary authorization code based on the MDN that was determined based on the decrypting;

create, by the third network server, a second redirect message that includes the callback URL of the identity server and the temporary authorization code; and send, by the third network server, the second temporary authorization code, to the identity server, by sending the second redirect message to the user device.

20. The non-transitory computer-readable medium of claim 14, wherein execution of the processor-executable instructions further causes the one or more processors to:

automatically create, by the application server, a service account, for a user of the user device, based on the subscriber information.

* * * * *